(12) United States Patent
Yuyama et al.

(10) Patent No.: US 6,308,494 B1
(45) Date of Patent: Oct. 30, 2001

(54) DRUG FILLING PACKAGING AND LABELING MACHINE

(75) Inventors: Shoji Yuyama; Hiroyasu Hamada, both of Toyonaka (JP)

(73) Assignee: Kabushiki Kaisha Yuyama Seisakusho, Osaka (JP)

( * ) Notice: Subject to any disclaimer, the term of this patent is extended or adjusted under 35 U.S.C. 154(b) by 0 days.

(21) Appl. No.: 09/612,265

(22) Filed: Jul. 7, 2000

Related U.S. Application Data

(62) Division of application No. 09/332,088, filed on Jun. 14, 1999, now Pat. No. 6,115,996, which is a division of application No. 08/988,383, filed on Dec. 10, 1997, now Pat. No. 5,946,883, which is a continuation-in-part of application No. 08/642,613, filed on May 3, 1996, now abandoned.

(51) Int. Cl.$^7$ .............................. B65B 5/10; B65B 61/26
(52) U.S. Cl. .............................. 53/131.3; 53/55; 53/154; 53/168; 53/171; 53/238; 53/281; 53/329.5
(58) Field of Search .................. 53/55, 131.3, 131.5, 53/168, 154, 171, 53, 64, 237, 238, 281, 505, 506, 296, 319, 329.5, 330

(56) References Cited

U.S. PATENT DOCUMENTS

| | | |
|---|---|---|
| 1,306,591 | 6/1919 | Grant . |
| 2,895,602 | 7/1959 | Hait . |
| 2,961,108 | 11/1960 | Johnson . |
| 2,963,839 | 12/1960 | Floyd et al. . |
| 3,367,484 | 2/1968 | Nelson . |
| 3,702,653 | 11/1972 | Mottin et al. . |
| 3,714,758 | 2/1973 | Vogeleer . |
| 3,720,038 | 3/1973 | Bryan, Jr. et al. . |
| 3,871,156 | 3/1975 | Koenig et al. . |
| 3,884,017 | 5/1975 | Butcher . |
| 3,927,506 | 12/1975 | Abd-Alla . |
| 4,035,987 | 7/1977 | Nakazato et al. . |
| 4,065,909 | 1/1978 | Mueller . |
| 4,312,523 | 1/1982 | Haines . |
| 4,362,002 | 12/1982 | Rowland et al. . |
| 4,599,123 | 7/1986 | Christensson . |
| 4,640,733 | 2/1987 | Bogren . |
| 4,655,026 | 4/1987 | Wigoda . |
| 4,724,654 | 2/1988 | Dahlin et al. . |
| 4,736,568 | 4/1988 | Shaw et al. . |
| 4,870,799 | 10/1989 | Bergerioux et al. . |
| 4,972,657 | 11/1990 | McKee . |
| 4,989,393 | 2/1991 | Sell et al. . |
| 5,097,652 | 3/1992 | Inamura et al. . |
| 5,117,614 | 6/1992 | Johnsen . |
| 5,208,762 | 5/1993 | Charhut et al. . |
| 5,335,476 | 8/1994 | Weder . |
| 5,337,919 | 8/1994 | Spaulding et al. . |
| 5,348,061 | 9/1994 | Riley et al. . |
| 5,502,944 | * 4/1996 | Kraft et al. ............................. 53/168 |
| 5,577,370 | 11/1996 | Pajak et al. . |
| 5,771,657 | * 6/1998 | Lasher et al. ............................ 53/55 |
| 6,006,946 | * 12/1999 | Williams et al. ......................... 53/55 |

* cited by examiner

Primary Examiner—John Sipos
(74) Attorney, Agent, or Firm—Wenderoth, Lind & Ponack, L.L.P.

(57) ABSTRACT

A drug filling machine has a plurality of feeders containing a plurality of different kinds of drugs. A plurality of drugs are discharged from one or some or the feeders into a vial. A sealing unit is provided for sealing the mouth of the vial with a transparent sheet. The sealing unit includes a sheet presser for pushing the transparent sheet into the mouth of the vial to form a sealing sheet having a tray-shaped section, a cutter for cutting the transparent sheet into a predetermined shape, and a heater for fusing the transparent sheet to the top end of the vial to seal the mouth of the vial.

2 Claims, 40 Drawing Sheets

FIG.15
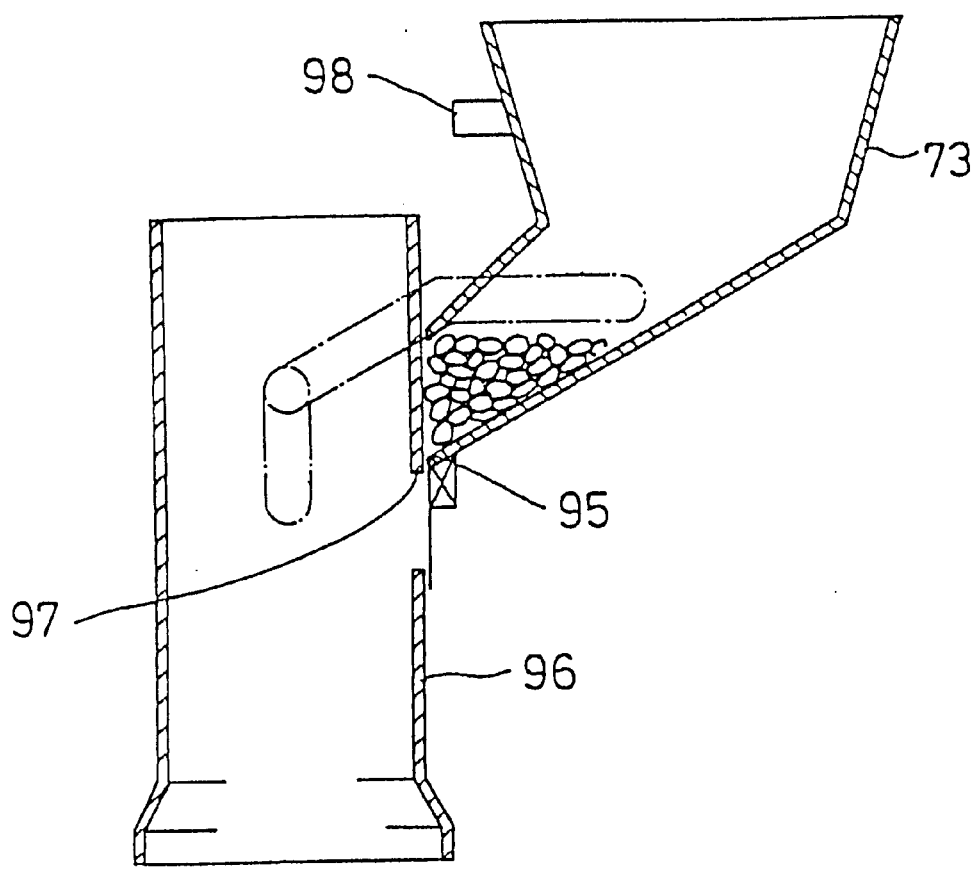
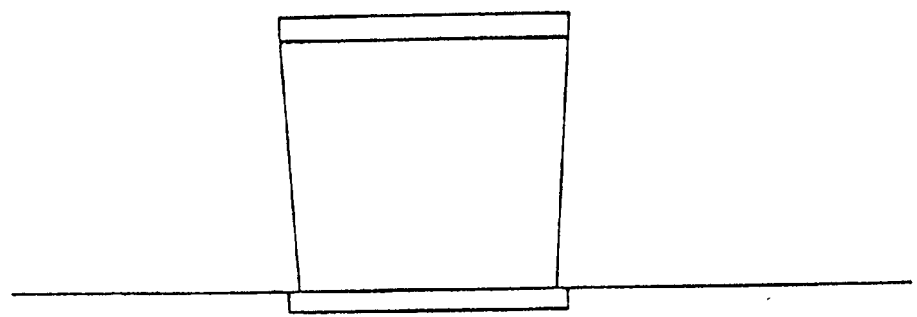

FIG.23
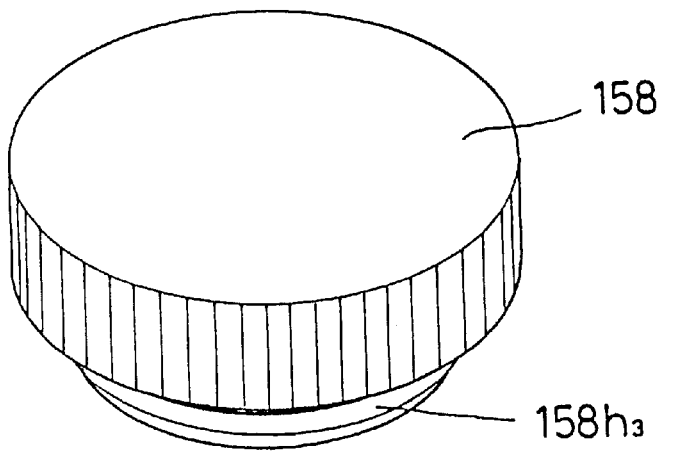
158
158h₃
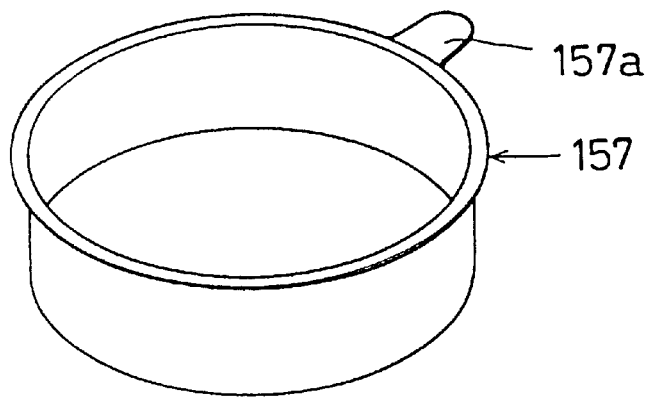
157a
157
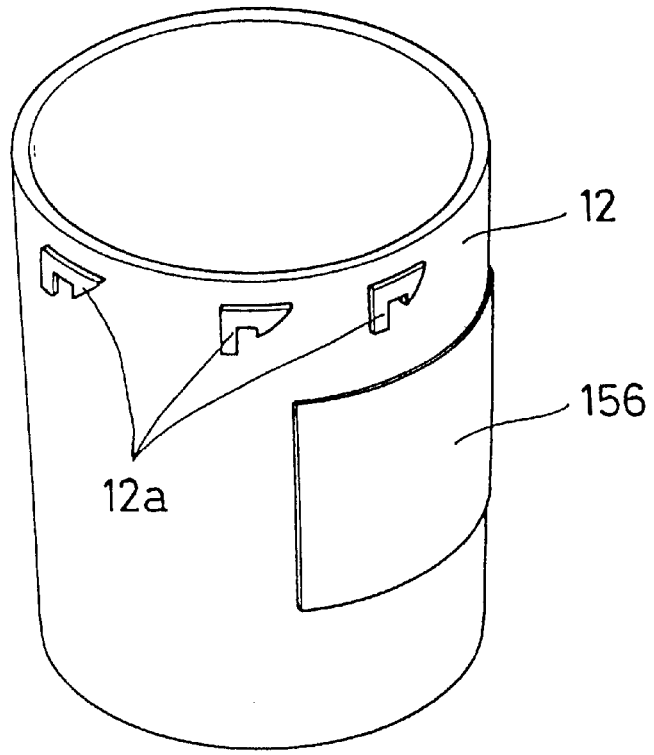
12
12a
156

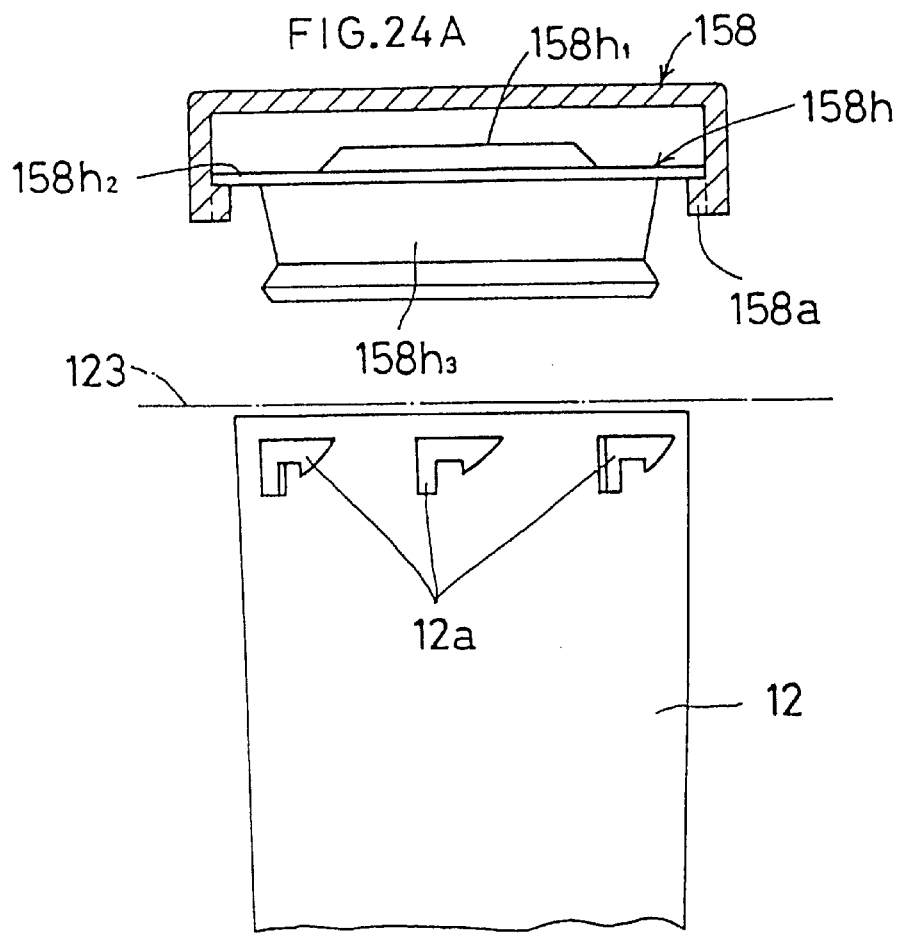
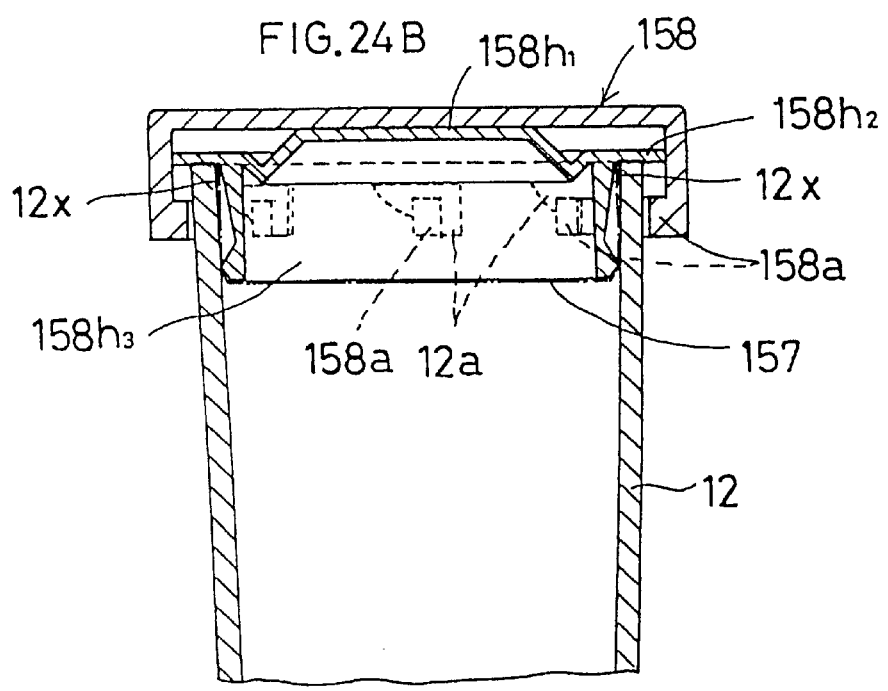

FIG. 32

DRUG DATA 211

| DRUG NAME | SHAPE | COLOR | INGREDIENT | WEIGHT | TAKING DIRECTIONS | SIDE EFFECTS | FIRST MAXIMUM AMOUNT | SECOND MAXIMUM AMOUNT | THIRD MAXIMUM AMOUNT | FOURTH MAXIMUM AMOUNT |
|---|---|---|---|---|---|---|---|---|---|---|
| GASTER | DRUM | RED | GASTAMIN | 2 | THREE TIMES A DAY AFTER MEALS | DROWSINESS | 50 | 100 | 150 | 200 |
| LASIX | SPHER-ICAL | WHITE | ...... | 2.5 | ...... | ...... | 70 | 140 | 210 | |
| ARTACTON | CAP-SULE | YELLOW | ... | 1.5 | ... | ...... | 30 | 60 | 90 | |
| MIONAL | OVAL | BLUE | ...... | 1 | ...... | ...... | ... | ... | ... | |
| PRUZEND | SPHER-ICAL | GREEN | ...... | 1.5 | ...... | ...... | ... | ... | ... | |

FIG. 33

PATIENT DATA 212

| NAME | ADDRESS | AGE | SEX | DEPARTMENT | DISEASE NAME | SYMPTOM | ALLERGY | CATE-GORY | WARD NAME |
|---|---|---|---|---|---|---|---|---|---|
| TARO YUYAMA | 1-1, OSAKA-CHO | 48 | MALE | INTERNAL | INFLUENZA | FEVER | POLLENOSIS | 1 | EAST WARD 2ND FLOOR |
| MASAHITO TERAUCHI | ......... | 39 | MALE | SURGERY | ......... | ......... | ......... | 2 | |
| TOMOHUMI MAKIYAMA | ......... | 28 | MALE | INTERNAL | ...... | ...... | ...... | 2 | |
| ⁞ | | | | | | | | | |

FIG. 34

FEEDER DATA 213

| DRUG NAME | FEEDER ADDRESS | STOCK COUNT | UPPER LIMIT |
|---|---|---|---|
| GASTER | A-01 | 315 | 600 |
| GASTER | A-02 | 430 | 600 |
| GASTER | A-03 | 408 | 600 |
| LASIX | A-04 | 796 | 1200 |
| ARTACTON | A-05 | 636 | 1000 |

FIG. 35

STOCK DATA 214

| FEEDER ADDRESS | STOCK COUNT | PRIORITY |
|---|---|---|
| A-01 | 315 | 3 |
| A-02 | 430 | 1 |
| A-03 | 408 | 2 |
| A-04 | 796 | 0 |
| A-05 | 636 | 0 |

FIG. 36

TABLET PRESCRIPTION AND REGISTERED — << TABLET PRESCRIPTION INPUTTED >> — No. 0001 94/ 4/10 11:47

| PATIENT ID | [ ① ] | | SEX | |
|---|---|---|---|---|
| DEPARTMENT | [ ] ② | AGE | PRIOR DATE OF PREPARATION | |
| WARD NAME | | | PRIOR DATE OF ADMINISTRATION | |
| | | | DATE OF ADMINISTRATION [ ]Y [ ]M [ ]D | |
| | | | VOUCHER [ ④ ] ③ | |
| | | | [ ]⑤ DOCTOR [ ]⑥ | |

INPATIENT/OUTPATIENT  PRESCRIPTION CATEGORY

| RP | POUCH CODE | DRUG NAME | DOSAGE | PATTERN | FORM |
|---|---|---|---|---|---|

PACKING CONDITIONS

NUMBER OF UNPACKED POUCHES  dd

PACKER CONDITION

INPUT PATIENT ID. [ HELP ]

| RESERV. CHANGED | DO | WRITTEN DATA CHANGED | INTER-RUPT | EXPAN-SION | REISSUE | | END |

FIG. 37

TABLET PRESCRIPTION AND REGISTERED    << TABLET PRESCRIPTION INPUTTED >>    No. 0001 94/ 4/10 11:47

| PATIENT ID | [00000010] | | SEX | MALE | |
|---|---|---|---|---|---|
| | TARO YUYAMA | | | | |
| DEPARTMENT | [01] INTERNAL | AGE | 48.00 | | |
| WARD NAME | EAST WARD 2ND FLOOR | | | | |

INPATIENT/OUTPATIENT IN    PRESCRIPTION CATEGORY [2] FIXED PERIOD    PRIOR DATE OF PREPARATION    PRIOR DATE OF ADMINISTRATION    DATE OF ADMINISTRATION [94]Y [4]M [10]D    VOUCHER [ ]

DOCTOR [KEITA YASUOKA]

| RP | POUCH | CODE | DRUG NAME | DOSAGE | PATTERN | FORM |
|---|---|---|---|---|---|---|
| 1 | | GAS | GASTER TABLET 20mg | 40 | 1111 | P |
| | | LSX | LASIX TABLET 20mg | 100 | 1111 | P |
| | | ART | ARTACTON A TABLET 20mg | 100 | 1111 | P |
| | /411 | | P4 AFTER MEALS & NIGHT 14 | | | |
| 2 | | MIO | MIONAL TABLET 50mg | 200 | 1010 | P |
| | /211 | | P2 AFTER BREAKFAST & SUPPER 7 | | | |
| 3 | | PRZ | PRUZEND TABLET | 100 | 0002 | P |
| | /101 | | P1 NIGHT 3 | | | |

PACKING CONDITIONS
NUMBER OF POUCHES WASTED    0
CUT    YES
PRINTED ON POUCHES    [001]
PRINTING OF INSPECTION    YES
ORDER OF PACKING    REPETITION

NUMBER OF UNPACKED POUCHES    dd

PACKER CONDITION    1

SELECT RP TO BE ISSUED.

[EXECUTE]    [ALL RP ON]    [ALL RP OFF]    [RETURN]

DRUG FILLING PACKAGING AND LABELING MACHINE

This is a divisional application of Ser. No. 09/332,088, filed Jun. 14, 1999, now U.S. Pat. No. 6,115,996 which is a divisional application of Ser. No. 08/988,383, filed Dec. 10, 1997, now U.S. Pat. No. 5,946,883, which is a continuation-in-part of Ser. No. 08/642,613, filed May 3, 1996, now abandoned.

This invention relates to a drug filling machine used in a pharmacy or a hospital, vials, and a method of inspecting drugs. More specifically, the invention concerns a drug filling machine which separately keeps a plurality of kinds of drugs such as tablets and capsules and which can automatically fill a vial with drugs of a designated kind by a designated amount, vials suitable for use with this drug filling machine, and a method of inspecting drugs sealed in these vials.

This type of drug filling machine is disclosed in the U.S. Pat. No. 5,337,919 to Gregory et al. This apparatus has a vial supply assembly. A vial supplied from the vial supply assembly is fed to one of a plurality of dispenser units, where it is filled with drugs. The vial filled with drugs is placed on a rotary conveyor.

Prescription drug label data are printed on a label. These data include the name and amount of drugs, directions for use, name of the pharmacist in charge, name of the recipient. The label is then stuck on the vial.

Drugs put in the vial are inspected while referring to the data printed on the label to check if they are right drugs.

After putting drugs into the vial, its mouth is usually not closed until the drugs therein are inspected. Thus, the vial containing drugs may sometimes be left with its mouth kept open for a rather long period of time. During this period, potentially hazardous foreign matter may mix into the vial. It is also hygienically unfavorable to leave the mouth of the vial kept open for a long time.

The simplest solution to this problem is to cap the mouth of the vial immediately after filling it with drugs. But this cap has to be removed later when inspecting the drugs in the vial. This adds to the trouble of inspection work.

In such a case, it is an ordinary practice to close the mouth of a vial with a transparent sheet as soon as necessary drugs are put in the vial to prevent the entry of foreign matter. After inspecting the contents of the vial, a doctor or a pharmacist puts a cap on the vial. An ordinary cap may however be uncapped erroneously by e.g. a kid who might break the transparent sheet and drink the content. Thus, it is preferable to provide a locking means which can lock the cap.

Such a locking means includes a cylindrical portion protruding downward from the cap and adapted to be inserted into the top of the vial. Thus, it is necessary that the transparent sheet be suitably shaped so as to receive the cylindrical portion of the cap when the cap is put on the vial.

On the label of each vial, only the data on directions for use should be printed. But heretofore, data used by pharmacists and doctors when inspecting the contents of vials were also printed on the label. The latter data are not only unnecessary for patients but can confuse them.

It is thus preferable to print the latter data, i.e. data to be used by pharmacists and doctors, on an area of the vial separate from the label. More preferably, such data are removed after inspection by pharmacists and doctors. Further, in large pharmacies and hospitals, it is necessary to fill, inspect and distribute drugs with high efficiency and high accuracy.

An object of this invention is to provide an arrangement with which the vial can be sealed with a transparent sheet to prevent any foreign matter from entering the vial and it is possible to prevent any children from opening the cap, breaking the transparent sheet and drinking the content of the vial, and which can print data to be used by pharmacists and doctors separately from data printed on the label of each vial to prevent confusion of patients.

Another object of this invention is to provide an arrangement which can fill, inspect and pack drugs with high efficiency.

SUMMARY OF THE INVENTION

According to this invention, there is provided a drug packaging device comprising feeders for feeding different kinds of drugs stored therein to different vials, and a sealing means for sealing the mouth of a vial with a transparent sheet after necessary drugs have been fed from the feeders into the vial. The sealing means includes a sheet presser for pushing the transparent sheet into the mouth of the vial to form a sealing sheet having a tray-shaped section, a cutter for cutting the transparent sheet into a predetermined shape before or after the sheet has been pushed into the vial by the sheet presser, and a heater for fusing the transparent sheet to the top end of the vial to seal the mouth of the vial after the sheet has been pushed into the vial.

By sealing the mouth of the vial with the transparent sheet, it is possible to prevent foreign matter from mixing into the vial. It is possible to visually check the contents of the vial through the transparent sheet.

Since the sealing sheet has a tray-like shape adapted to the shape of the cap, the cap can be locked without fear of breaking the sealing sheet. Thus it is possible to prevent the breakage of the sheet e.g. by a child.

By printing data used when checking the drugs in the vials on the transparent sheet, it is possible to quickly check the drugs inside. Since these data are printed separately from the data intended for patients printed on the label, patients will not be confused by the former data.

By using a transparent sheet comprising a sealing area for sealing the mouth of the vial, and a printing area protruding from the edge of the mouth of the vial, it is possible to more easily check the contents of the vial through such a transparent sheet.

Also, by providing a tear line along the boundary between the sealing area and the printing area, the printing area can be cut off after inspection so as not to provide unnecessary data to patients.

The drug filling machine according to this invention may further comprise a vial storage means that separately stores a plurality of different kinds vials, a designating means for designating a kind of vials to be filled with drugs, a vial dispensing means for discharging a vial of the kind designated by the designating means from the vial storage means, a detecting means for detecting the mouth of the vial discharged by the vial dispensing means, and a vial erecting means for adjusting the position of the vial discharged based on the output from the detecting means so that the vial is erected with its mouth looking upward by the time drugs are put into the vial. This machine can select and supply a vial according to the amount of drugs discharged.

This machine may further comprise a judging means for determining the kind of vial discharged by the vial dispensing means, and a means for eliminating the vial discharged by the vial dispensing means if the kind determined by the judging means differs from the kind designated by the designating means. With this arrangement, even if a wrong vial is selected from among a plurality of kinds of vials stored in the vial storage means, it is possible to eliminate such a wrong vial before filling drugs therein.

This drug filling machine may further comprise a sealing means for sealing a plurality of vials filled with drugs in an envelope, and a printing means for printing data on the drugs in the vials sealed in the envelope on the envelope. Typically, the patient's name and address are printed on the envelope.

The sealing means according to the present invention comprises a means for pushing the transparent sheet into the vial, a cutter for cutting the transparent sheet, and a heater for fusing the transparent sheet to the mouth of the vial. When pushed into the vial, the sheet is recessed like a tray. In this state, the sheet is cut and fused to the mouth of the vial.

Other features and objects of the present invention will become apparent from the following description made with reference to the accompanying drawings, in which:

BRIEF DESCRIPTION OF THE DRAWINGS

FIGS. 15 and 16 are sectional views of the lower part of the hopper of the drug dispenser shown in FIG. 12;

FIG. 23 is a perspective view of a vial stored in the apparatus of FIG. 1;

FIG. 24A is a sectional view showing the vial and FIG. 24B is a similar view of the vial mounted on the vial;

FIG. 32 is a view of drug data stored in the host computer in the control unit of FIG. 31;

FIG. 33 is a view showing patient data stored in the host computer in the control unit of FIG. 31;

FIG. 34 is a view showing feeder data stored in the host computer in the control unit of FIG. 31;

FIG. 35 is a view showing stock data stored in the stock memory in the control unit of FIG. 31;

FIG. 36 is a view showing a prescription data entry table to be displayed on the CRT of the host computer in the control unit of FIG. 31;

FIG. 37 is a view showing data entered in the table of FIG. 36;

DETAILED DESCRIPTION OF THE PREFERRED EMBODIMENT

Figure 1:
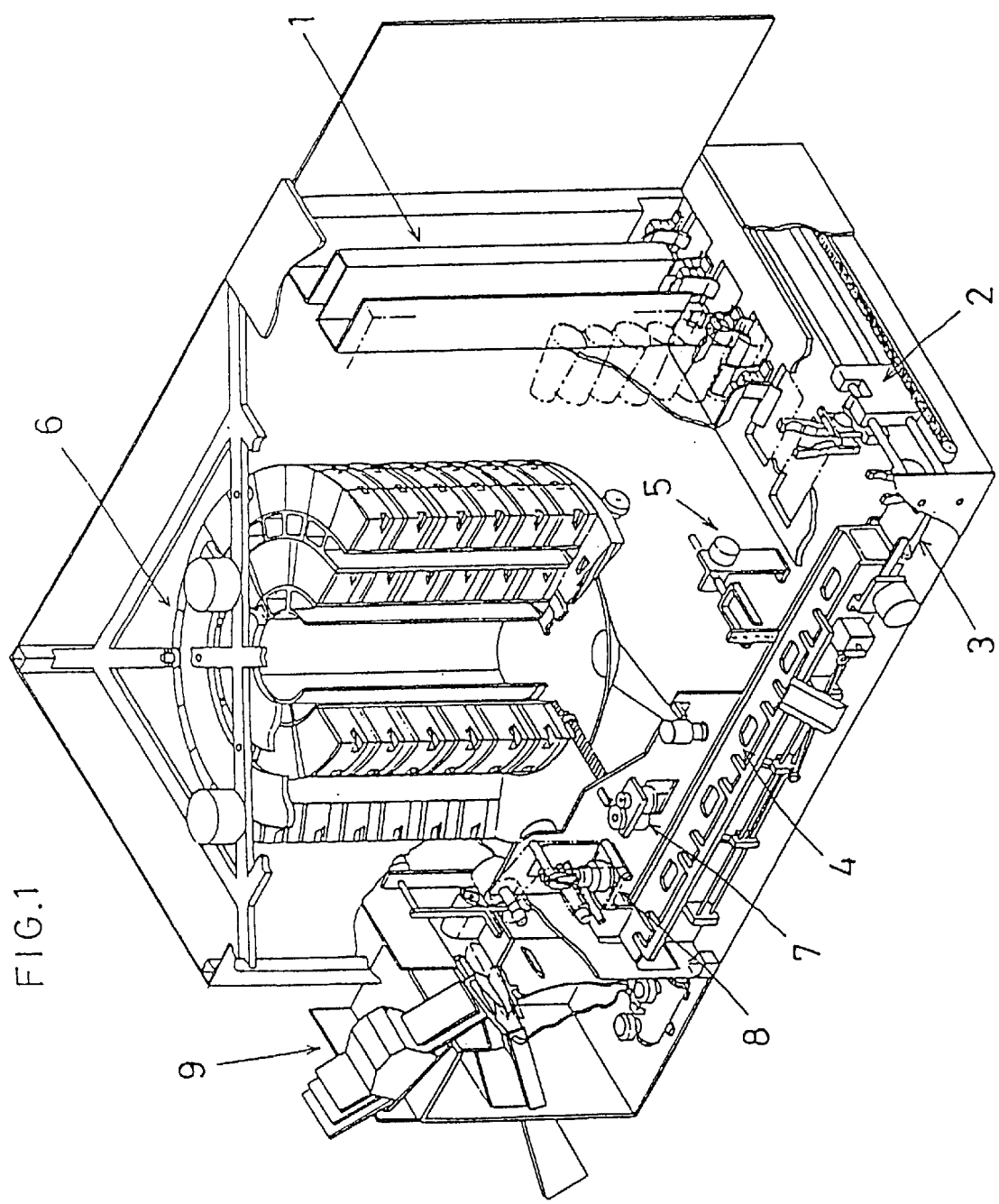
FIG. 1 is a perspective view of one embodiment of the drug filling machine according to this invention.

The drug filling machine of the embodiment shown in FIG. 1 comprises a vial housing unit 1, a vial dispenser 2, a vial erecting unit 3, an intermittent conveyor 4, an unacceptable vial eliminator 5, a drug dispenser 6, a labeller 7, a transparent sheet sealer 8 and an envelope dispenser 9.

Figure 2:
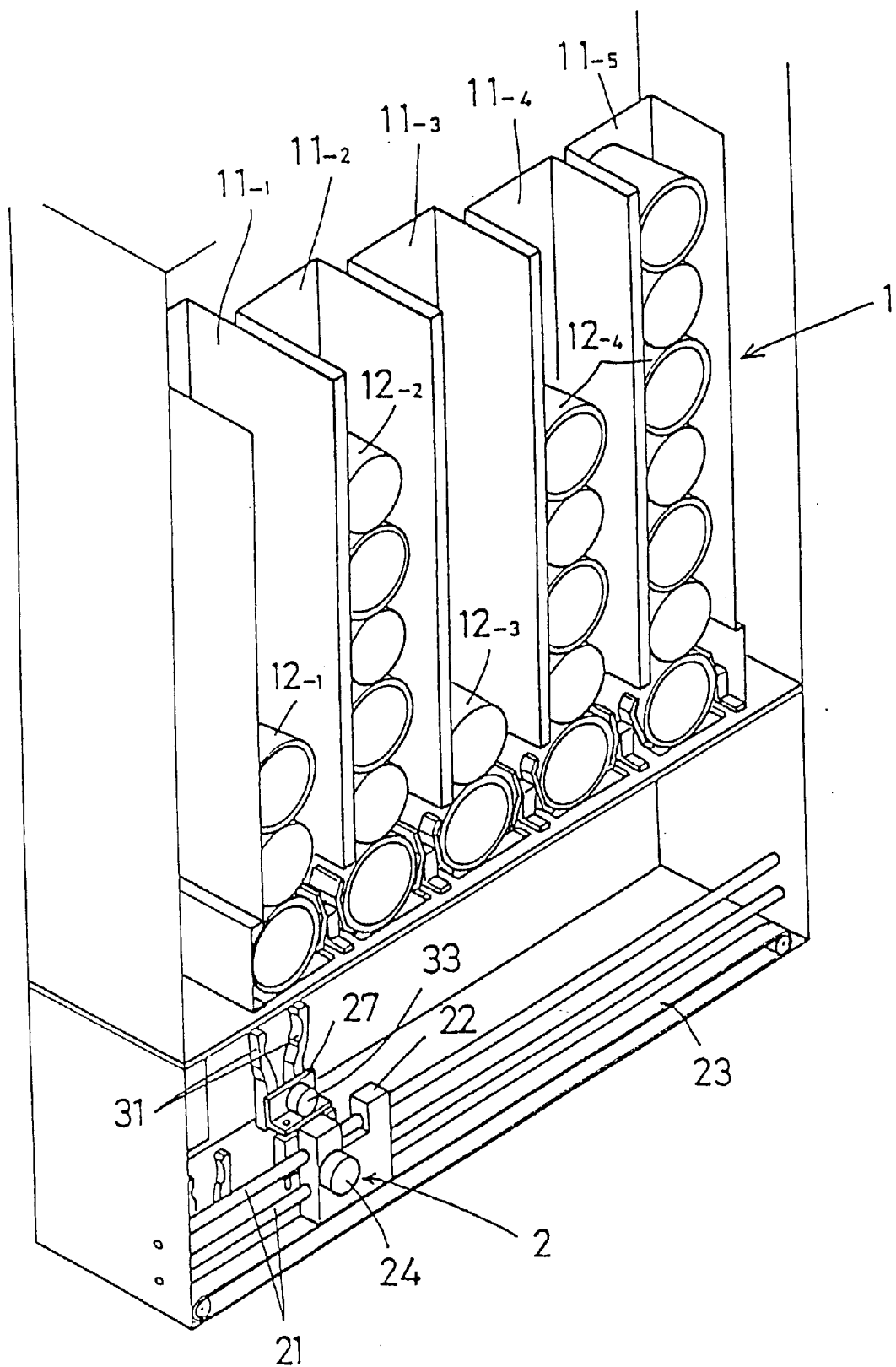
FIG. 2 is a perspective view of a vial housing unit of the drug filling machine of FIG. 1.

As shown in FIG. 2, the vial housing unit 1 has five vertical rows of vial storage frames 11-1 to 11-5. Tallest vials 12-1 are stored in the first-row frame 11-1, the second tallest vials 12-2 in the second-row frame 11-2, the third tallest ones 12-3 in the third-row frame 11-3, and the shortest ones 12-4 in the fourth- and fifth-row frames 11-4 and 11-5.

The vials 12 are truncated conical-shaped, and are piled one over another in each frame 11 so that alternate vials have their mouths facing the front with the remainder having their bottoms facing the front.

Figure 3:
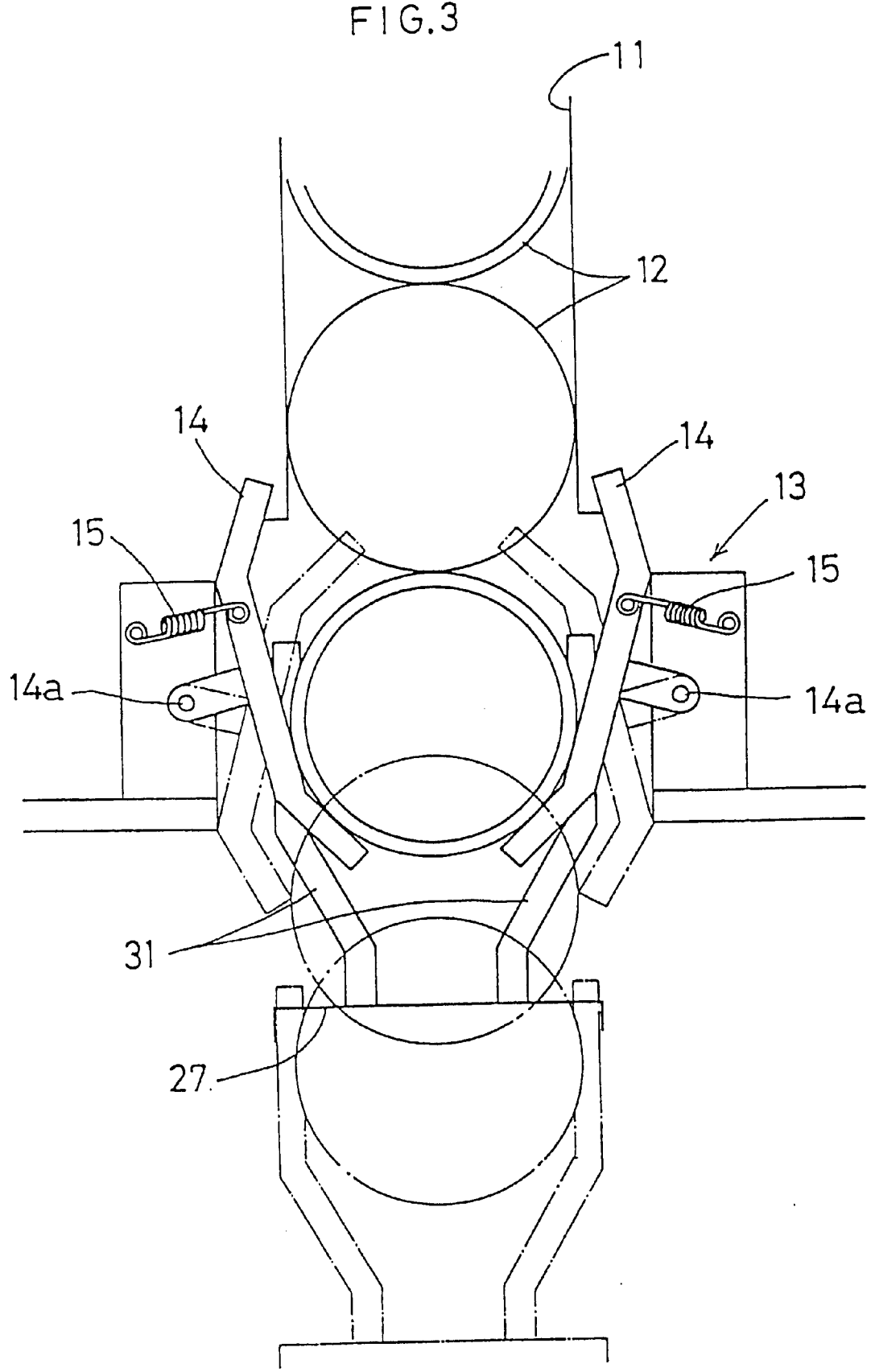
FIG. 3 is an enlarged plan view of the lower part of the vial housing unit of FIG. 2.

Referring to FIG. 3, a vial stopper 13 is provided under each vial frame 11. The vial stopper 13 comprises a pair of gripping fingers 14 pivotable about points 14a, and a pair of coil springs 15 biasing the fingers 14 to close their bottom ends. While the fingers 14 are closed, the vials 12 in the frame 11 are supported on the fingers.

Figure 4:
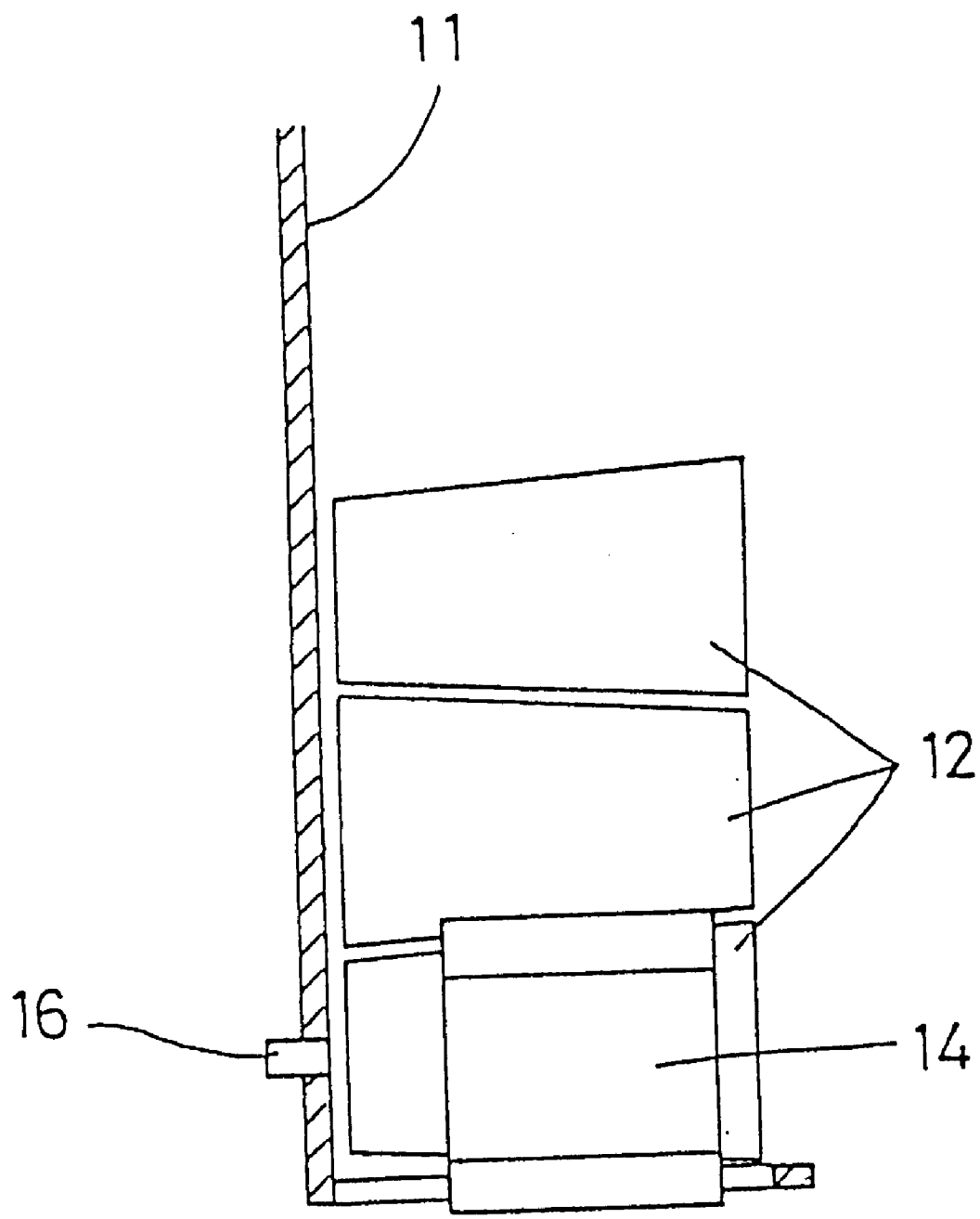
FIG. 4 is a sectional view of a vial storage frame in the vial housing unit of FIG. 2.

As seen in FIG. 4, a distance sensor 16 is provided under each vial storage frame 11, opposite the bottom of the lowermost vial, to measure the distance to the bottom. If the vial is positioned such that its mouth faces the sensor 16, the distance to its bottom is rather long. If it is positioned the other way around, the distance to its bottom is short. Thus, based on the output from the sensor 16, it is possible to determine which way the lowermost vial 12 is positioned.

Figure 5:
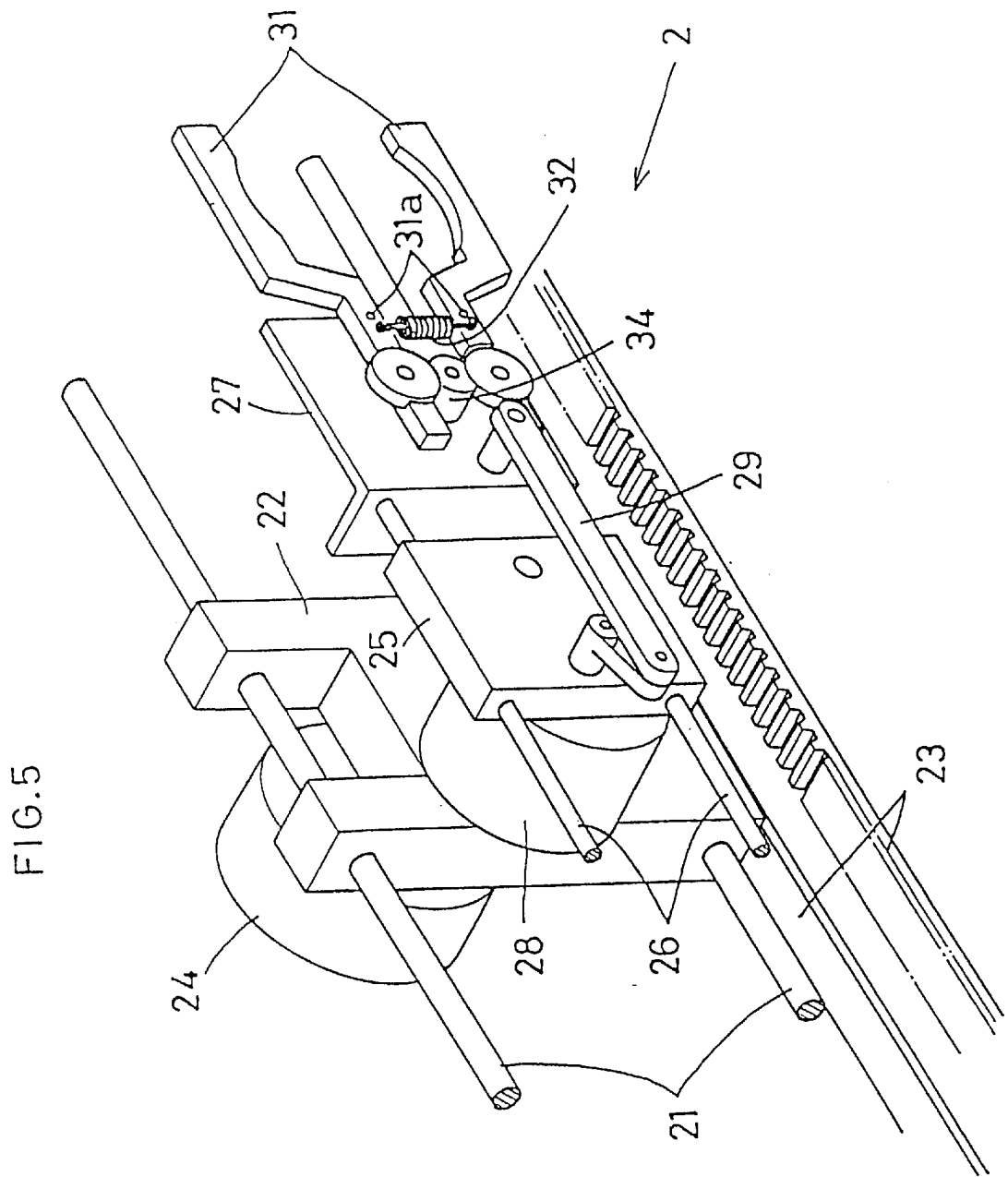
FIGS. 5 and 6 are perspective views of the vial dispenser of the drug filling machine of FIG. 1.
Figure 6:
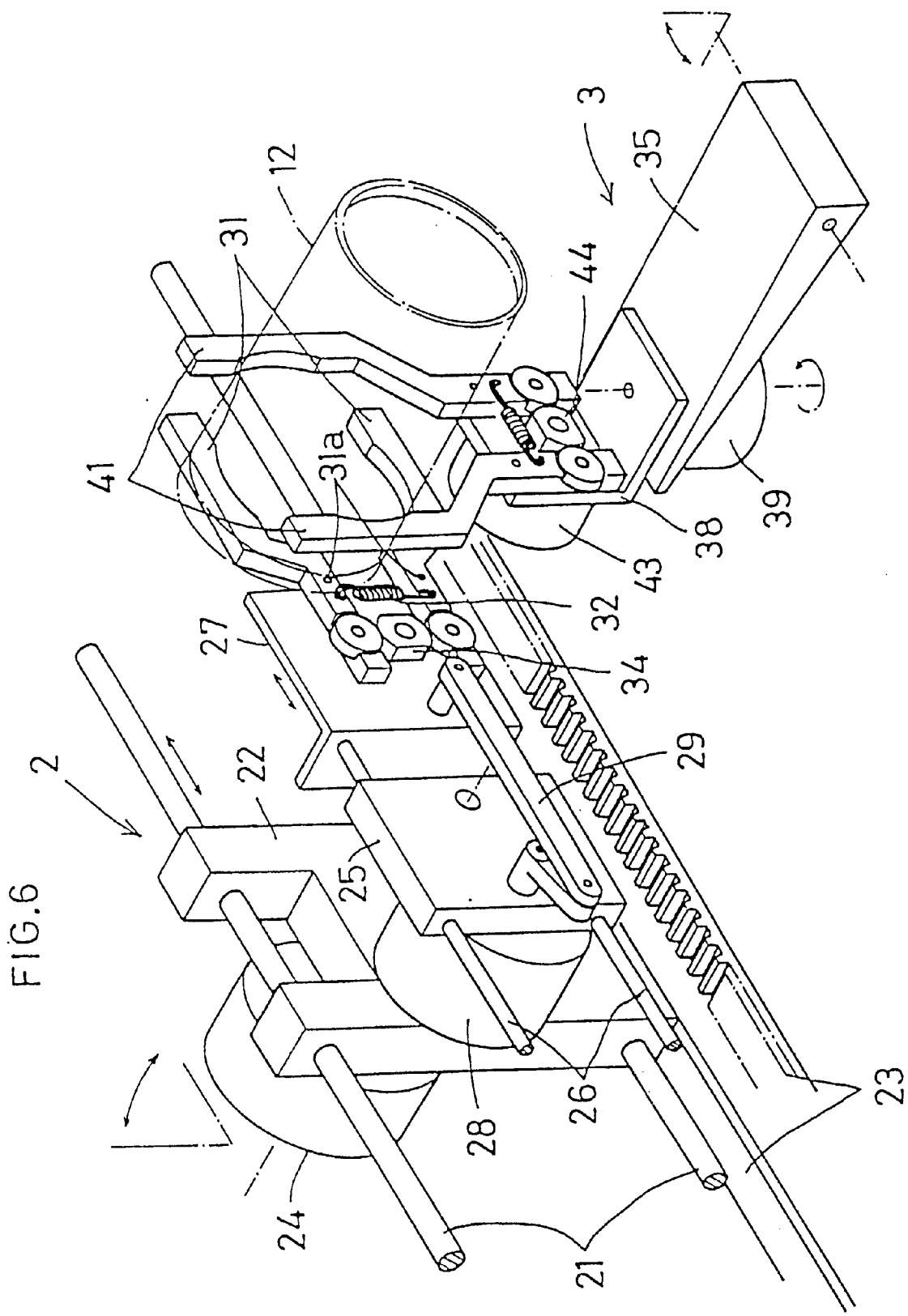

The vial dispenser 2 shown in FIGS. 5 and 6 has a pair of horizontal guide rods 21 and a slider 22 horizontally slidably mounted on the horizontal guide rods 21. The slider 22 is connected to an endless belt 23 and is moved by driving the belt 23 with a motor (not shown).

The slider 22 carries a motor 24 having its output shaft connected to a pivot member 25. By driving the motor 24, the pivot member 25 can be pivoted between an upright position and a horizontal position.

A pair of rods 26 slidably extend through the pivot member 25. A carriage 27 is fixed to the top ends of the rods 26. The pivot member 25 carries a carriage driving motor 28 having its output shaft coupled to the carriage 27 through a link 29 to move the carriage 27 up and down.

The carriage 27 supports a pair of gripping fingers 31 pivotable about points 31 and biased by a coil spring 32 so that their tips are spread apart. The carriage 27 carries a motor 33 (as shown in FIG. 2) having its output shaft connected to a cam 34 disposed between the fingers 31. By rotating the cam 34 with the motor 33, the fingers 31 can be opened and closed.

When the kind of vials to be discharged is selected from among the vials 12-1–12-4 in the manner to be described later, the belt driving motor is activated to move the slider 22 through the belt 23 to the position right under the drug storage frame 11 that stores the vials of the designated kind. The carriage 27 is then raised by activating the carriage driving motor 28. With the carriage raised, the fingers 31 are closed by activating the motor 33 to hold the vial between the fingers 31 as shown in FIG. 3. The carriage 27 is lowered in this state to disengage the vial from the fingers 13 of the vial storage frame 11 by pulling it down. The slide 22 is then moved to the position near the vial erecting unit 3.

Figure 7:
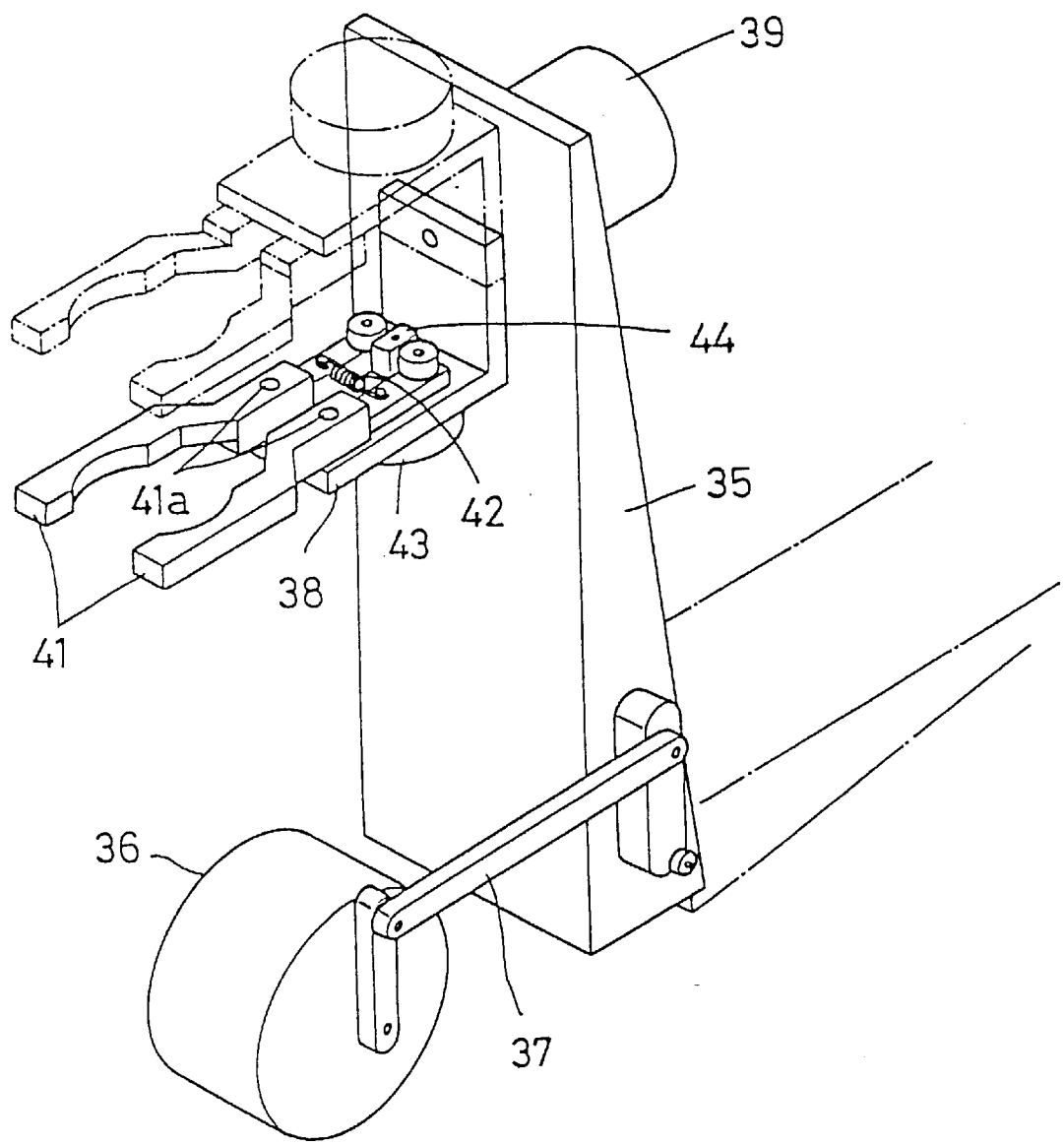
FIG. 7 is a perspective view of the vial erecting unit of the drug filling machine of FIG. 1.

As shown in FIGS. 6 and 7, the vial erecting unit 3 has a pivot member 35 which can be pivoted between an upright position and a horizontal position by a motor 36 coupled to the pivot member 35 through a link 37.

A frame 38 is pivotally mounted on the pivot member 35 and is pivoted by a motor 39 having its output shaft connected to the frame 38.

The pivotable frame 38 has a pair of gripping fingers 41 pivotable about points 41a. They are spread apart by being biased by a coil spring 17. A motor 18 is mounted on the frame 38. It has its output shaft connected to a cam 19. The fingers 41 can be opened and closed by rotating the cam 19 with the motor 18.

With the pivot member 35 of the vial erecting unit 3 kept in the horizontal position and its fingers 41 open, the pivot member 25 of the vial dispenser 2 is tipped to its horizontal position to put the vial 12 between the fingers 41 of the vial erecting unit 3. By opening the fingers 31 of the vial dispenser 2 and closing the fingers 41 of the vial erecting unit 3, the vial 12 is transferred from the vial dispenser 2 to the vial erecting unit 3. Thereafter, the slider 22 of the vial dispenser 2 is moved horizontally, its pivot member 25 is erected, and the pivot member 35 of the vial erecting unit 3 is erected.

Figure 8:
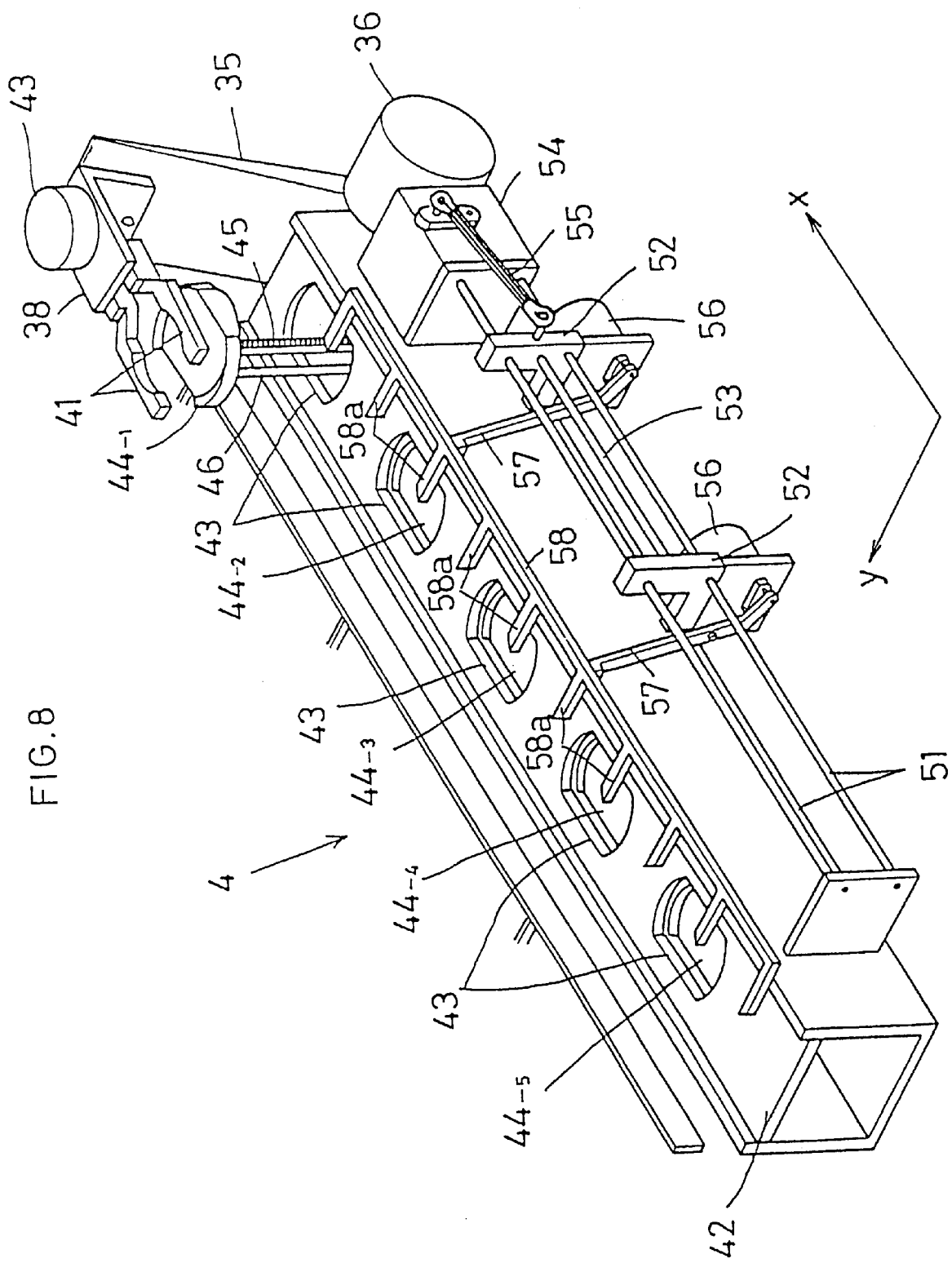
FIG. 8 is a perspective view of the intermittent conveyor of the apparatus of FIG. 1.
Figure 9:
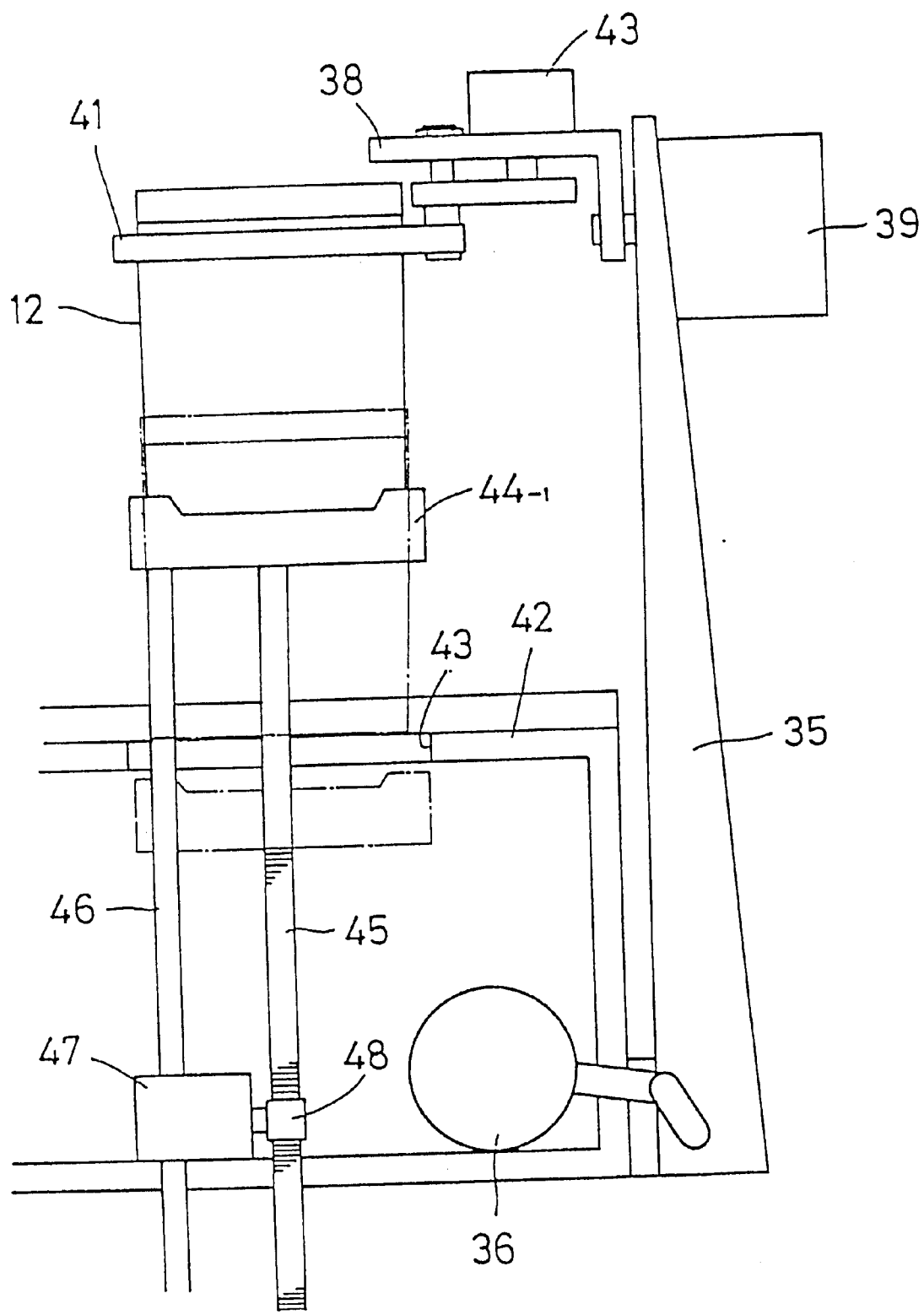
FIG. 9 is a side view showing the intermittent conveyor of FIG. 8 and the vial erecting unit of FIG. 7.

Now referring to FIGS. 8 and 9, the intermittent conveyor 4 has a shelf plate 42 formed with five holes 43, and five trays 44-1 to 44-5 corresponding to the respective holes 43. A rack gear 45 and a rod 46 are fixed to the bottom of each tray 44. Each rack gear 45 is in mesh with a pinion gear 48 fixed to the output shaft of a motor 47. By activating the respective motors 47, the rack gears 45 and the corresponding trays 44 are moved vertically through the holes 43 between a position where the trays 44-1–44-5 are slightly lower than the shelf plate 42 and a position where they are slightly higher than the shelf plate.

With the trays 44-1 to 44-5 raised to the position higher than the shelf plate 42, the pivot member 35 of the vial erecting unit 35 is erected and its fingers 41 are opened to drop the vial 12 onto the first tray 44-1. After the vial 12 has been released, the pivot member 35 of the vial erecting unit 3 is tilted to its horizontal position to receive another vial 12 from the vial dispenser 2.

Before placing the vial 12 on the first tray 44-1, judgment is made whether it is held by the fingers with its mouth up or down based on the output from the distance sensor 16 provided in the corresponding vial housing frame 11. If its mouth is up, it is placed on the tray as it is. If positioned upside down, it has to be turned by 180 by pivoting the frame 38 so that its mouth is up before placing it on the tray.

A pair of guide rods 51 are fixed to and extend parallel to one side wall of the intermittent conveyor 4. A pair of x-axis sliders 52 connected together by a connecting rod 51 are mounted on the guide rods 51 so as to be slidable in the x-axis direction. An x-axis motor 54 has its output shaft coupled to one of the x-axis slider 52 through an x-axis link 55. By activating the motor 54, the x-axis sliders 52 are reciprocated in the x-axis direction.

Each x-axis slider 52 carries a y-axis motor 56 having its output shaft coupled to a conveyor frame 58 through a y-axis link 57. By activating the y-axis motors 56, the conveyor frame 58 is moved in the y-axis direction.

By reciprocating the x-axis sliders 52 in the x-axis direction with the x-axis motor 54 and simultaneously moving the conveyor frame 58 in the y-axis direction with the y-axis motors 56, the frame 58 can be moved in a combined direction of the x-axis and y-axis directions. By activating the x-axis motor 54 and the y-axis motors at predetermined timings with the trays 44-1 to 44-5 lowered below the shelf plate 42, it is possible to hold the vial 12 on the shelf plate over the first tray 44-1 between adjacent rungs 58a of the conveyor frame 58 and slide it to the position right over the second tray 44-2. Similarly, it is possible to slide vials located over the second to fourth trays 44-2–44-4 to the next trays 44-3–44-5 by holding them between adjacent rungs 58a of the frame 58. Thus, each vial can be fed intermittently from the first tray 44-1 to the fifth tray 44-5.

Figure 10:
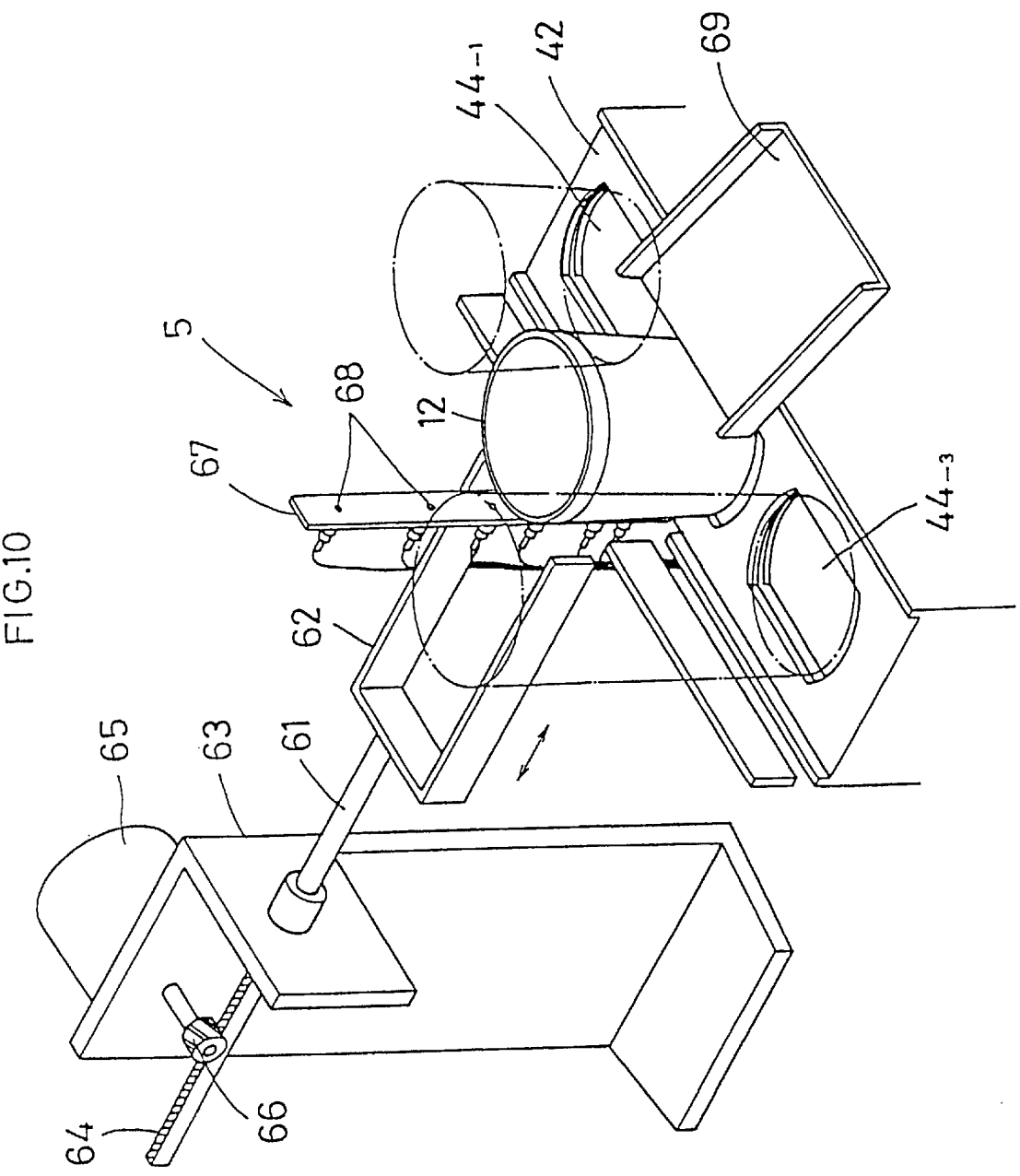
FIGS. 10 and 11 are perspective views of the unacceptable vial eliminator of the apparatus shown in FIG. 1.
Figure 11:
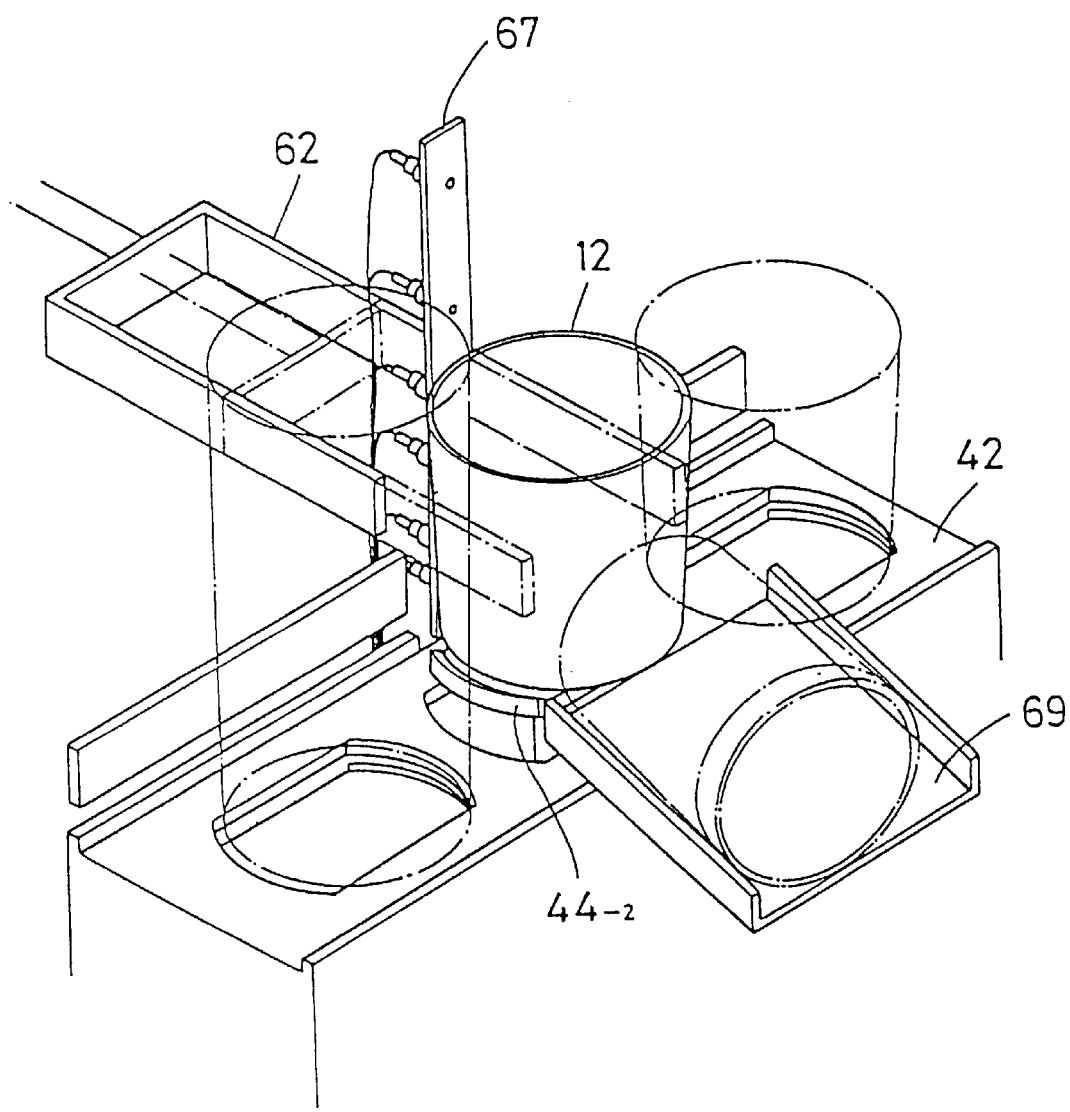

Referring to FIGS. 10 and 11, the unacceptable vial eliminator 5 is provided beside the second tray 44-2. It has a rod 61 slidably mounted on a support 63 and provided with a rack gear 64 in mesh with a pinion gear 66 of the output shaft of a motor 65. The rod 61 is thus reciprocated by the motor 65. By moving the rod 61 by activating the motor 65 with the tray 44-2 raised to a predetermined level, the vial 12 on the tray 44-2 is thrust down onto a slider 69 by a U-shaped frame 62 attached to the tip of the rod 61.

A height sensor 67 is provided near the tray 44-2. It comprises a plurality of photosensors 68 arranged vertically at predetermined intervals. After lowering the tray 44-2 until the vial 12 lands on the shelf plate 42, the height of the vial is measured with the photosensors 68.

Figure 12:
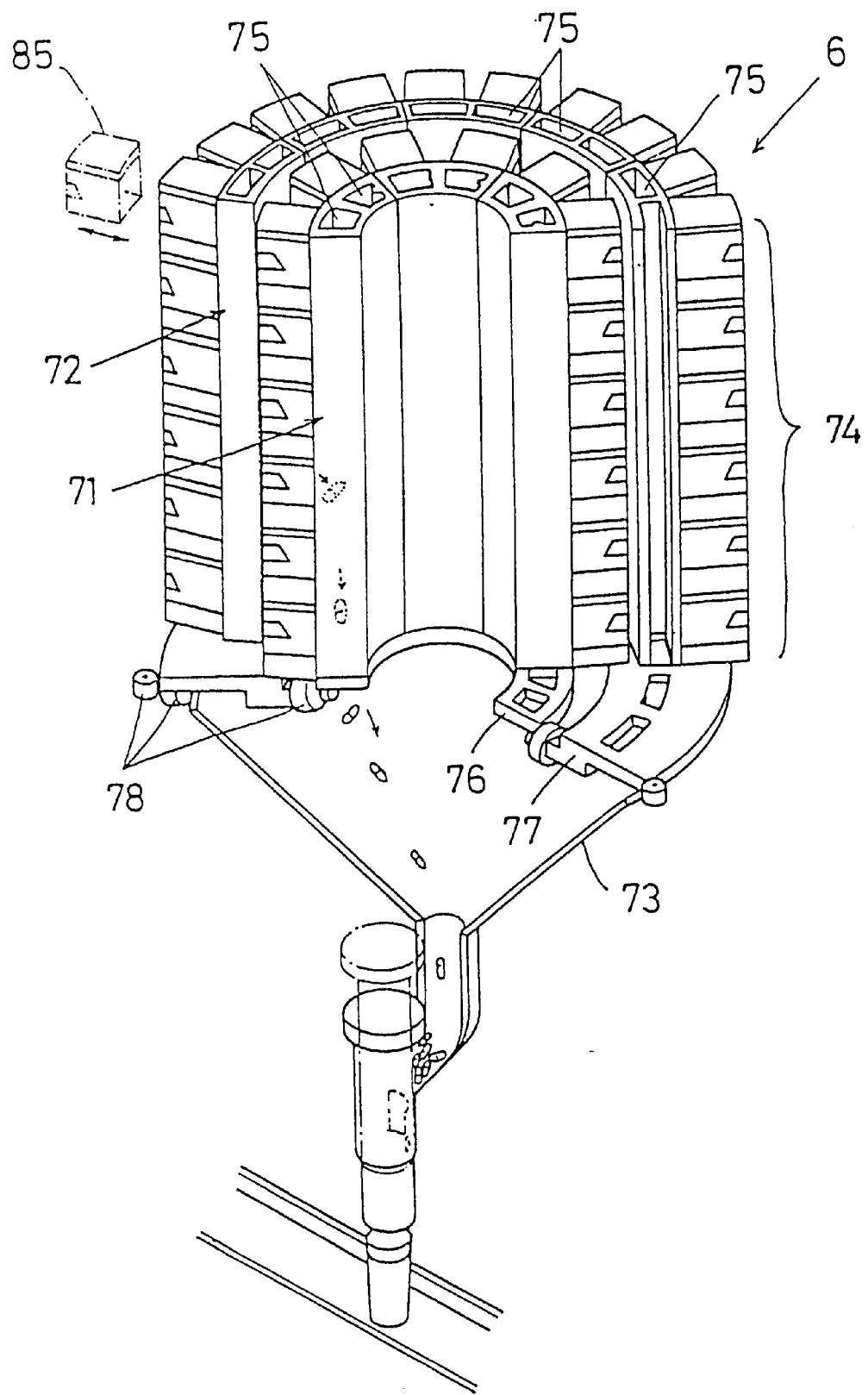
FIG. 12 is a partially cutaway perspective view of the drug dispenser of the apparatus shown in FIG. 1.
Figure 13:
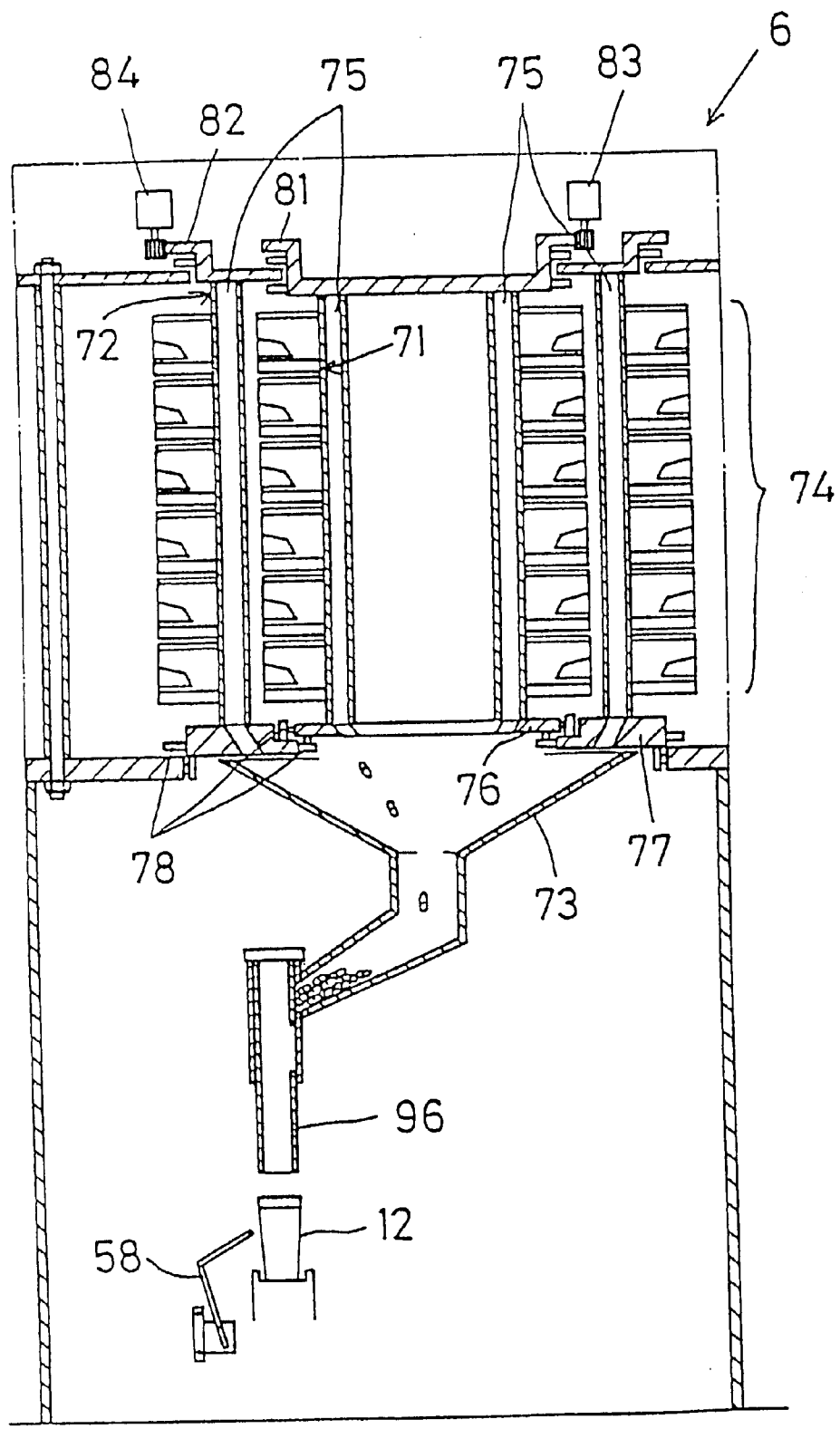
FIG. 13 is a sectional view of the drug dispenser of FIG. 12.

The drug dispenser 6 shown in FIGS. 12 and 13 comprises an inner annular portion 71, an outer annular portion 72 and a hopper 73. The inner annular portion 71 and the outer annular portion 72 comprise each a plurality of annularly arranged, vertical feeder rows 74, and drug falling passages 75 provided inside the respective feeder rows 74.

The inner annular portion 71 is supported on an inner annular shelf 76, while the outer annular portion 72 is placed on an outer annular shelf 77. The inner annular shelf 76 and the outer annular shelf 77 are rotatably supported by a plurality of rollers 78. Circular gears 81 and 82 are fixed to the top ends of the inner annular portion 71 and the outer annular portion 72, respectively. They are in mesh with gears of the output shafts of motors 83 and 84, so that by activating the motors 83 and 84, the inner annular portion 71 and the outer annular portions 72 are rotated.

In order to set feeders 85 in a particular feeder row 74 of the inner annular portion 71 or the outer annular portion 72 or to detach feeders therefrom, this particular feeder row 74 is moved to a predetermined position turning the inner annular portion 71 or the outer annular portion 72. At this predetermined position, a window is provided that permits access to the outer annular portion 72 from outside. Sufficiently wide gaps are provided between the adjacent feed rows of the outer annular portion 72, so that the inner annular portion 71 is also accessible from outside through the window and one of these gaps.

Figure 14:
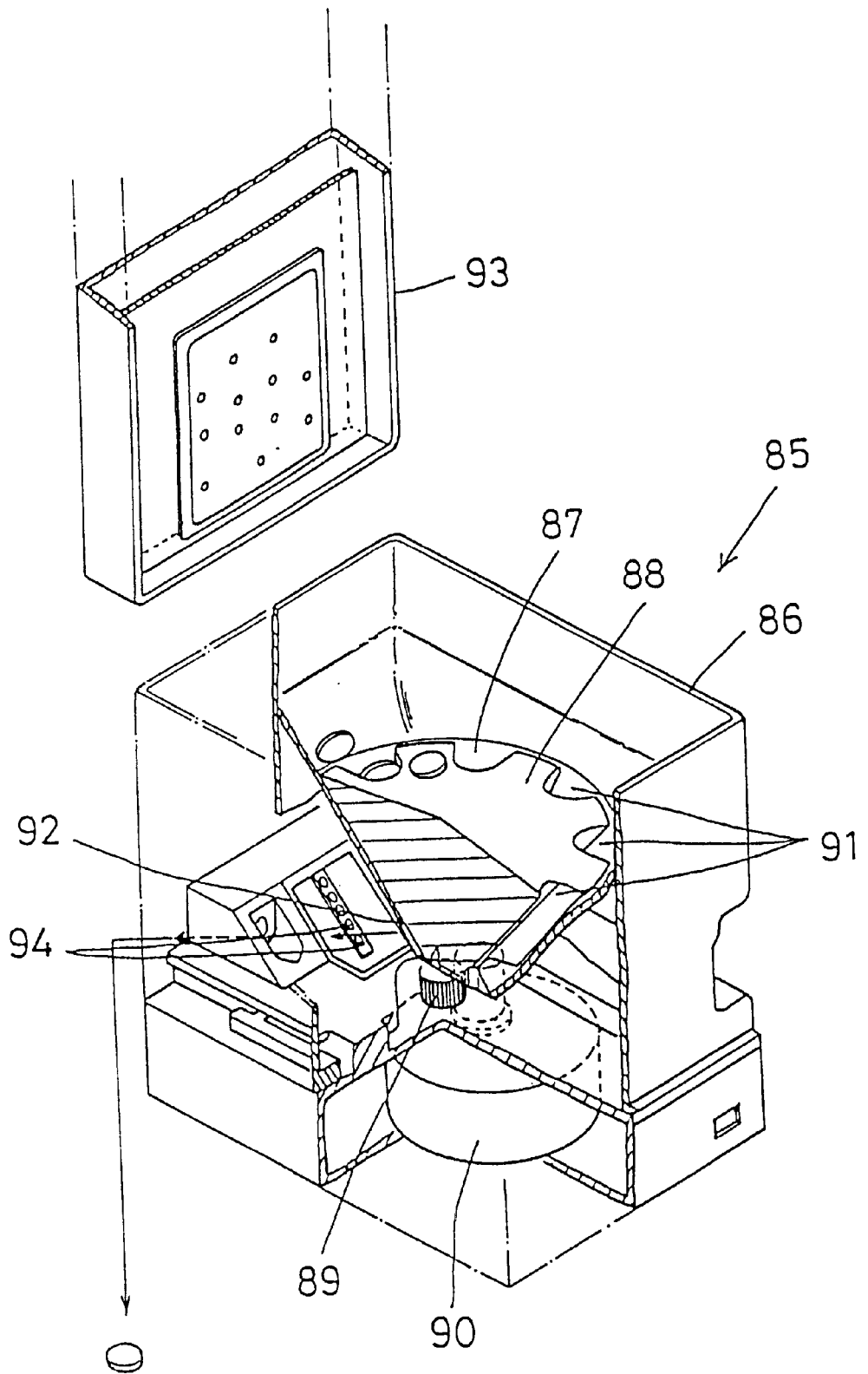
FIG. 14 is a perspective view of a feeder of the drug dispenser shown in FIG. 12.

Each feeder row 74 comprises a plurality of feeders 85 arranged in a vertical row. Each feeder 85 comprises, as shown in FIG. 14, a case 86, a mortar-shaped container 87 housed in the case 86, a conical member 88 rotatably received in the container 87, a gear 89 fixed to the tip of the conical member 88, and an intermittent motion motor 90 having its geared output shaft in mesh with the gear 89. By driving the motor 90, the conical member 88 is intermittently rotated. A plurality of grooves 91 are formed in the outer periphery of the conical member 88. The mortar-shaped container 87 has a discharge opening 92 at its bottom.

With the case 86 filled with a plurality of drugs and closed with a lid 93, the conical member 88 is intermittently rotated to let drugs in the case move into the grooves 91. By further rotating the conical member 88 intermittently, the grooves 91 are moved one by one into alignment with the discharge opening 92 of the mortar-shaped container 87. Every time a groove 91 aligns with the opening 92, the single drug in this groove 91 is discharged through the opening 92 under centrifugal force. The drug discharged is discharged through the discharge path shown by arrow A into the drug falling passage 75. It then drops through the passage 75 into the hopper 73. Drug sensors (photosensors) 94 are provided near the drug discharge path shown by arrow A. They can detect drugs being discharged.

Figure 16:
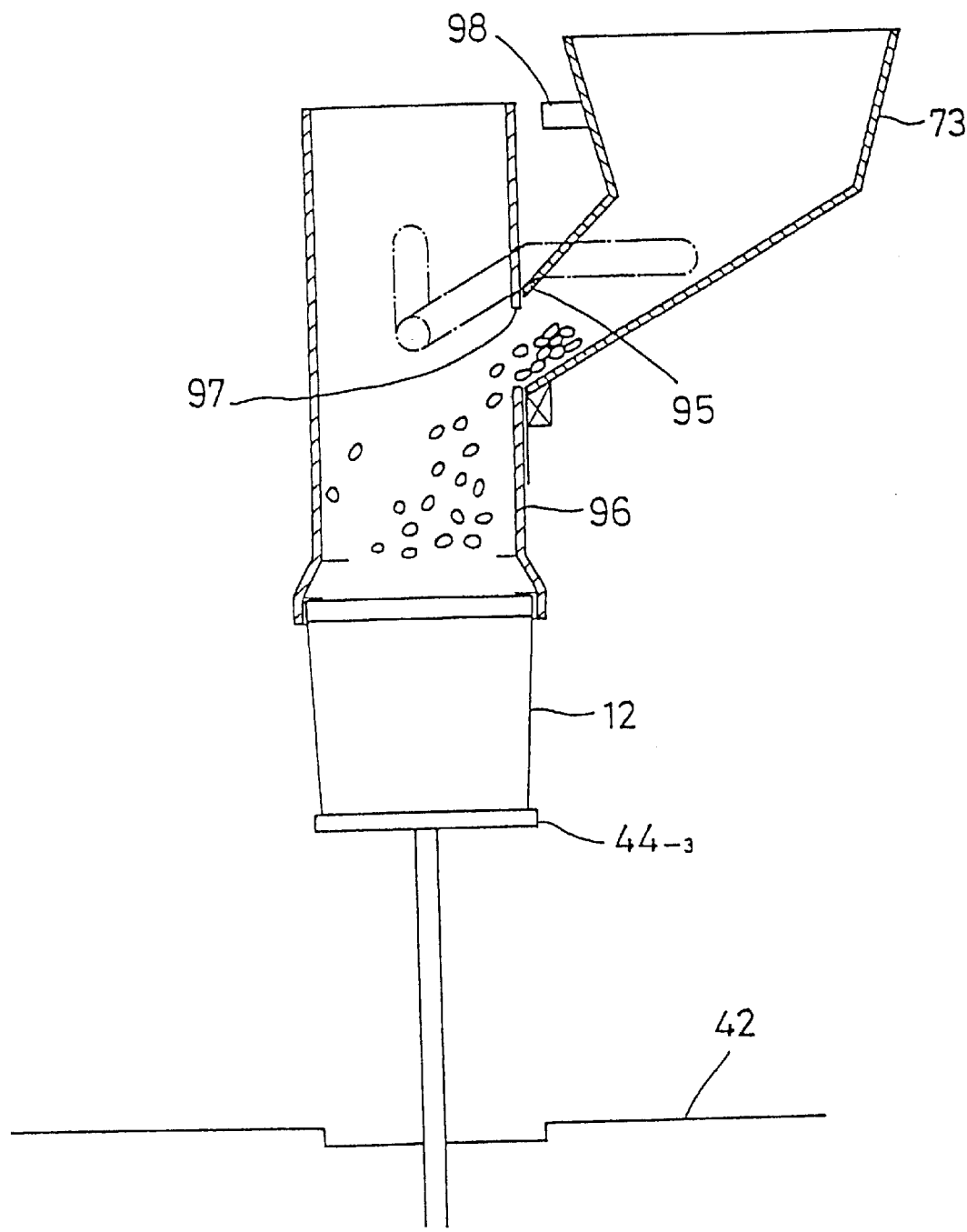

Referring to FIG. 15, the hopper 73 collects and stores a plurality of drugs in its central part. A vertically movable cylinder 96 is provided near the discharge port 95 of the hopper 73. By raising the tray 44-3 with a vial 12 placed thereon as shown in FIG. 16, the cylinder 96 is pushed up by the vial 12 until a hole formed in the side wall of the cylinder 96 aligns with the discharge port 95 of the hopper 73, so that the drugs in the hopper are discharged through the discharge port 95 and the hole 97 and drop into the vial 12. A photosensor 98 is provided on the hopper 73. It confirms that the cylinder 73 has been raised to the position where the hole 97 and the discharge port 95 align with each other by detecting the top end of the cylinder 96. With this arrangement, thus preventing a failure to discharge all the drugs in the hopper into the vial 12.

Figure 17:
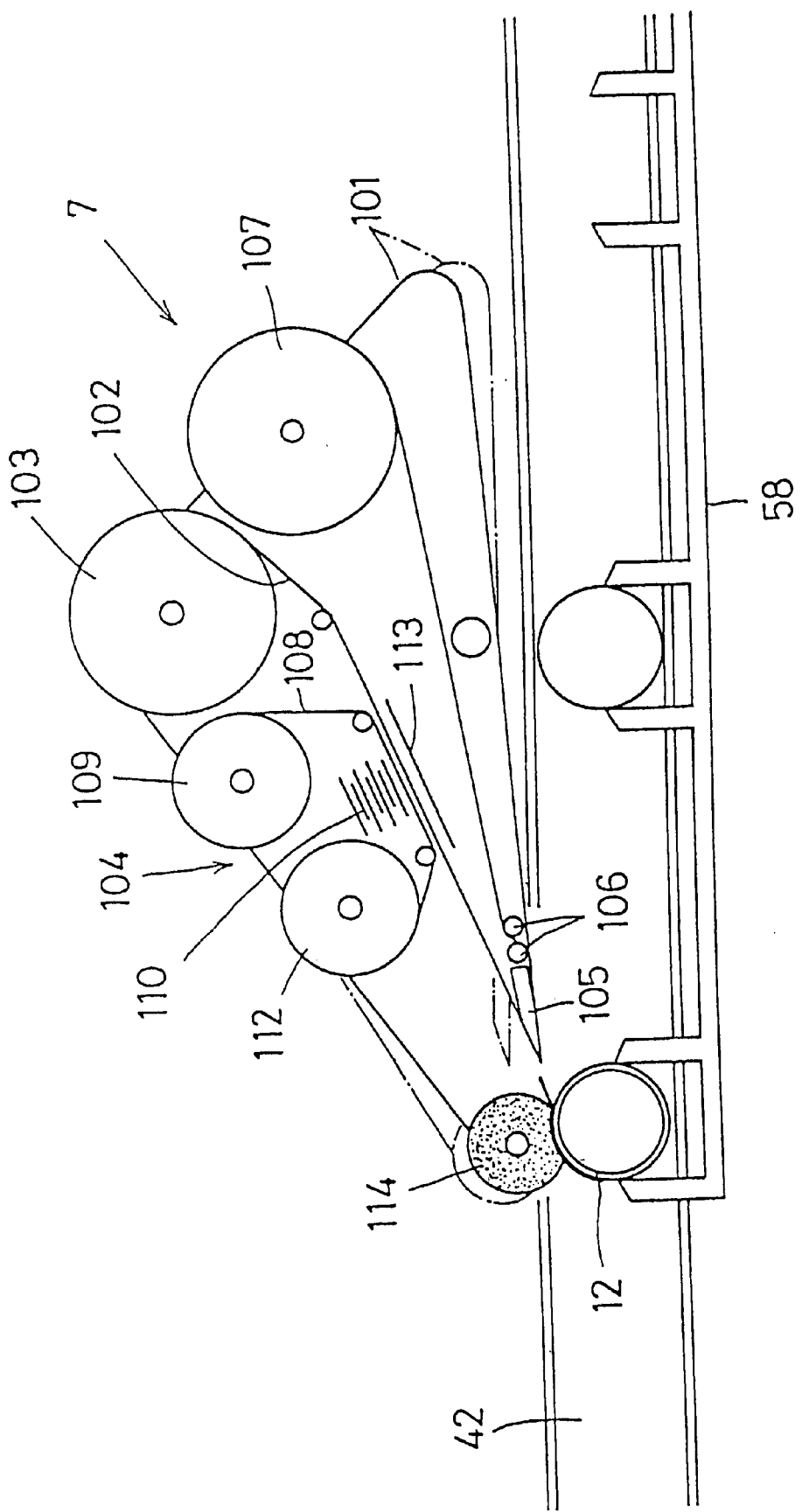
FIG. 17 is a plan view of the labeller of the apparatus shown in FIG. 1.
Figure 18:
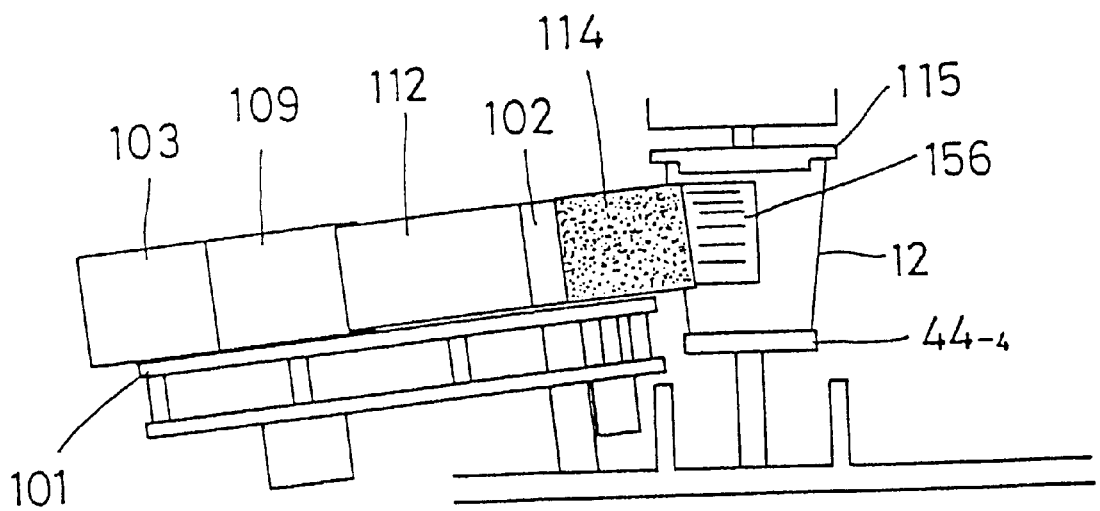
FIG. 18 is a side view of the labeller of FIG. 17.
Figure 19:
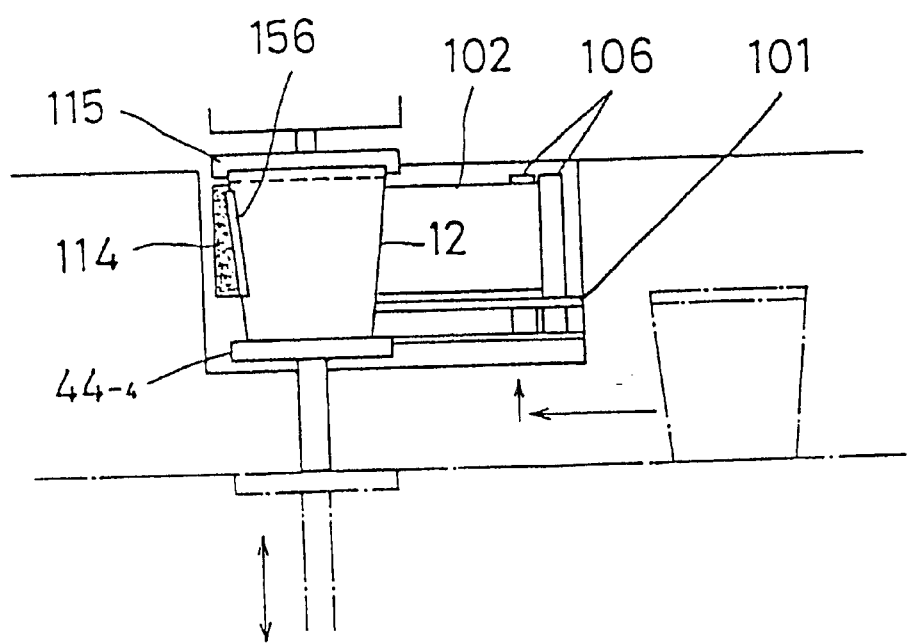
FIG. 19 is a front view of the same.

As shown in FIGS. 17 through 19, the labeller 7 is mounted on a frame 101 which can be positioned by pivoting it with an unshown driving mechanism as shown by slide and chain lines. A label sheet 102 is fed in the labeller 7 through its label sheet feed reel 103→printer 104→peel plate 105→guide rollers 106→label sheet winding reel 107. The label sheet 102 is a strip of release paper. A plurality of labels are adhesively stuck on the sheet, keeping predetermined intervals from each other.

The printer 104 has a printing ribbon 108 which is run through its printing ribbon feed reel 109→printing head 110→printing ribbon winding reel 112. The printing ribbon 108 and the label sheet 102 are guided into between the printing head 110 and a guide plate 113, where they are superposed one on the other to print necessary information on a label on the label sheet 102 with the printing head 110. After printing, the label is sent to the peel plate 105 and peeled off the sheet when passing the plate 105.

A sponge roller 114 is rotatably mounted on one end of the frame 101. A rotatable disk 115 is provided over the tray 44-4. After raising the tray with a vial 12 placed thereon until the vial 12 is pressed against the disk 115, the disk 115 is rotated at a constant speed to rotate the vial 12.

While the tray 44-4 is not raised, the frame 101 is positioned as shown by chain line. When the disk 115 begins to rotate with the vial 12 on the tray 44-4 pressed against the disk by raising the tray 44-4, the frame 101 is moved to the position shown by solid line to press the sponge roller 114 against the vial 12. The sponge roller 114 thus begins to rotate together with the vial 12. In this state, the label sheet 102 is fed between the printing head 110 and the guide plate 113 to print data on a label on the sheet. The printed label is moved to the peel plate 105 and peeled off the sheet 102. It is then fed into between the sponge roller 114 and the vial 12 and stuck on the vial 12 by being pressed by the sponge roller 114. Once the label is stuck on the vial, the frame 101 is moved back to the position shown by chain line to separate the sponge roller 114 from the vial 12, and the tray 44-4 is lowered.

Figure 20:
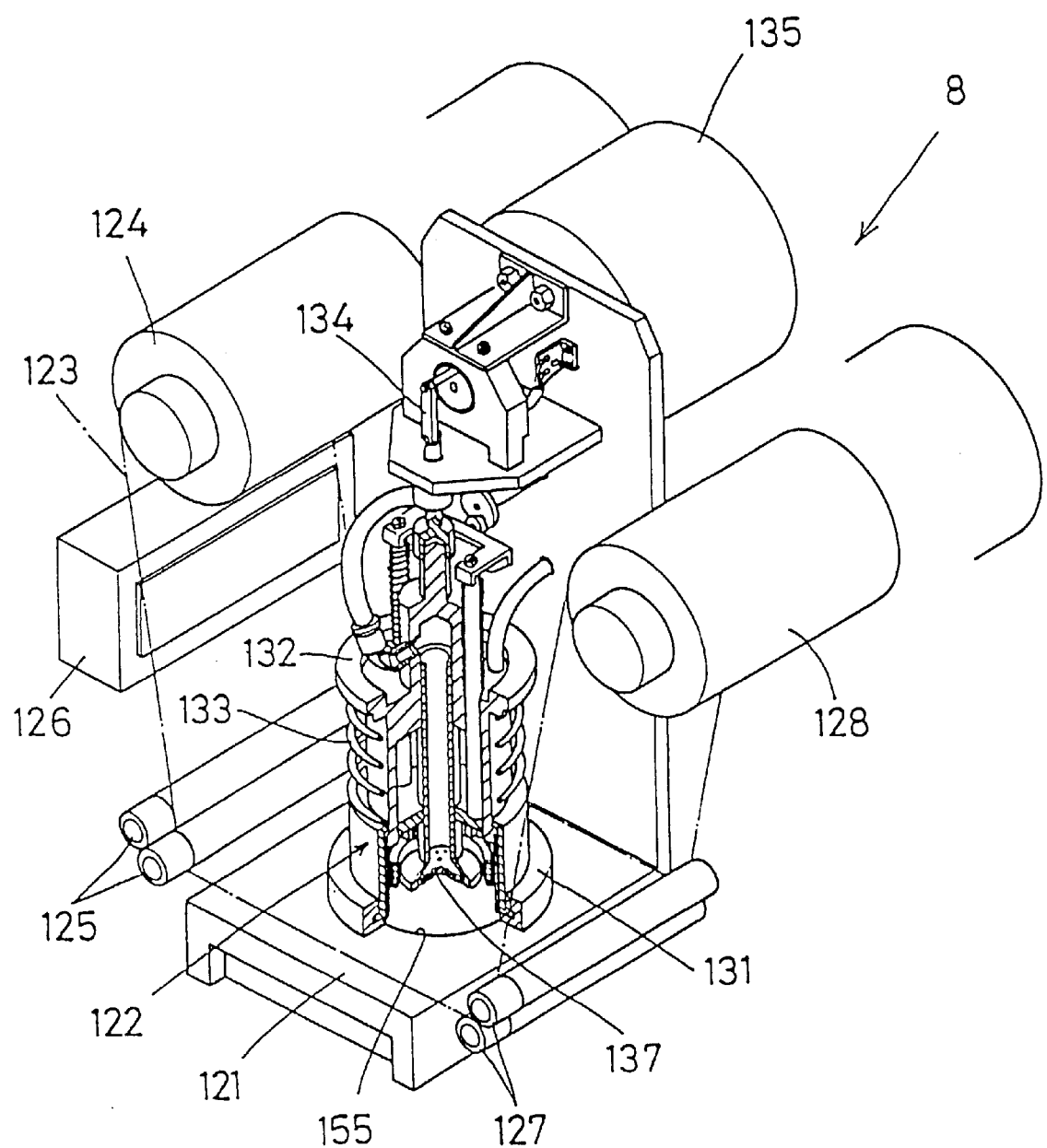
FIG. 20 is a perspective view of the transparent sheet sealing unit of the apparatus of FIG. 1.
Figure 21:
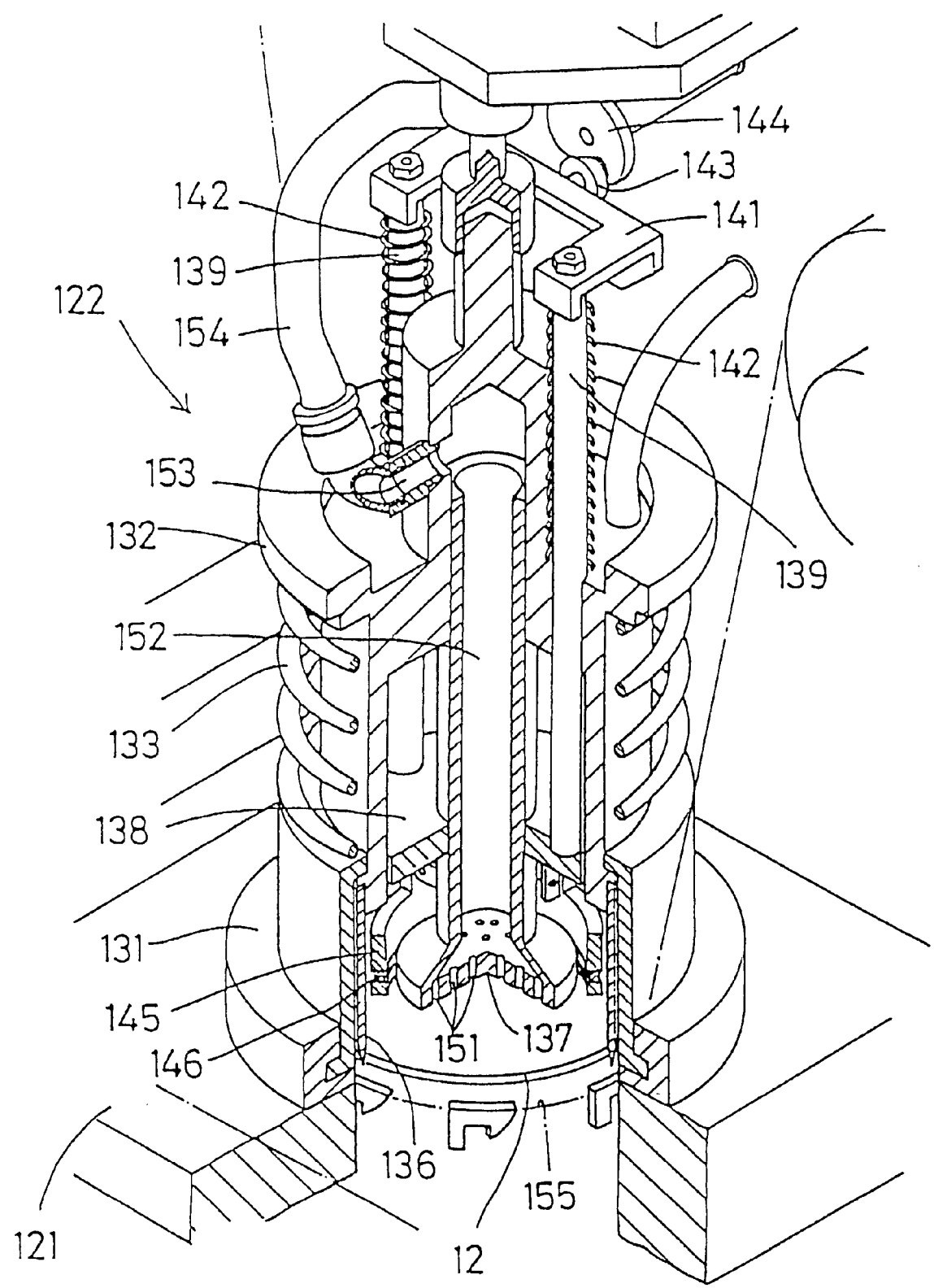
FIG. 21 is an enlarged perspective view of the transparent sheet sealing unit of FIG. 20.
Figure 22:
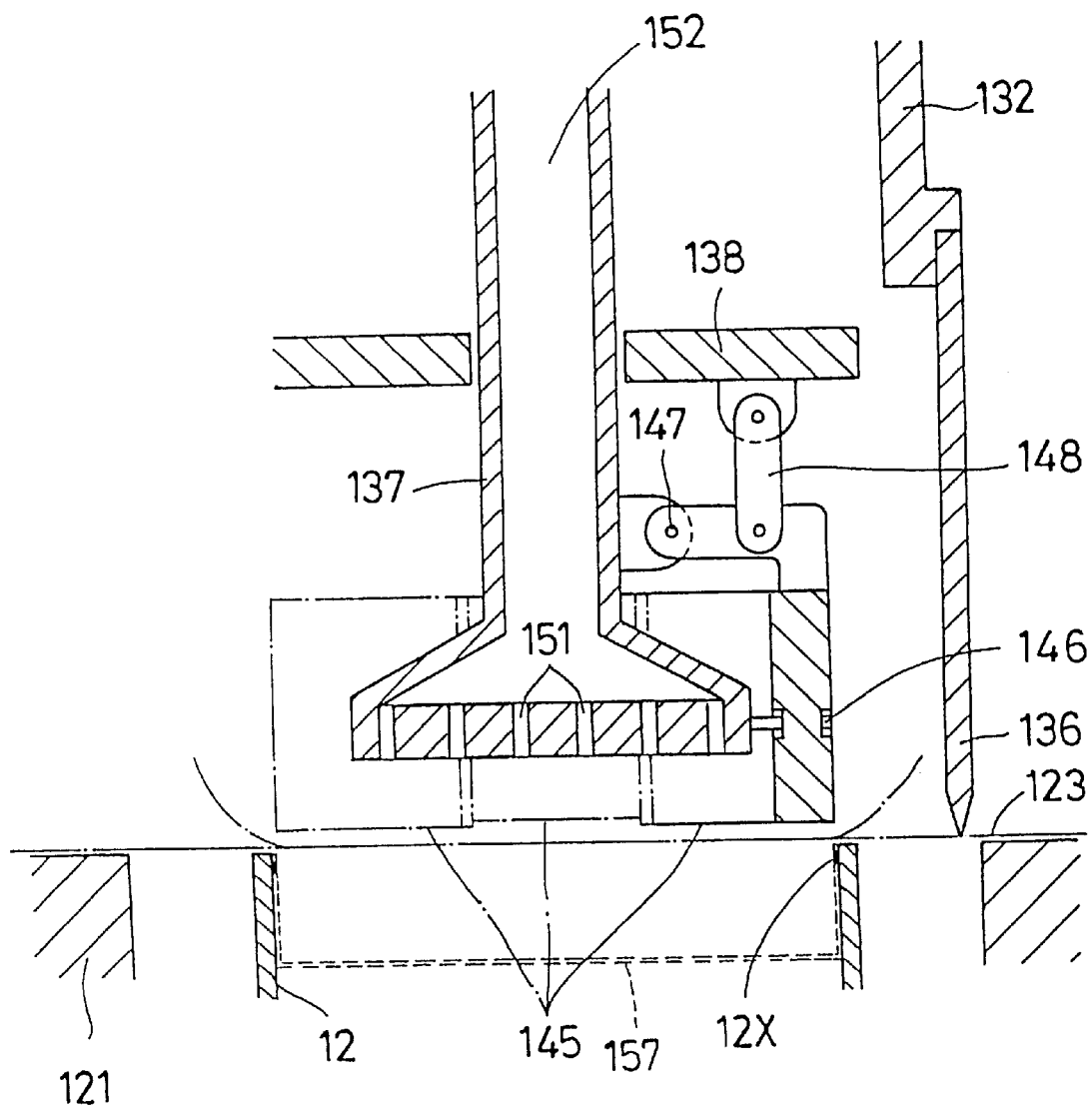
FIG. 22 is a sectional view of the lower part of the transparent sheet sealing unit of FIG. 20.

Now referring to FIGS. 20 through 22, the transparent sheet sealer 8 has a suction/cutter unit 122 supported on a frame 121. Between the frame 121 and the suction/cutter unit 122 is a small gap into which is slid a transparent sheet 123. The transparent sheet 123 is fed in the sealer 8 through its sheet feed reel 124→printer 126→guide rollers 127→sheet winding reel 128.

The suction/cutter unit 122 comprises a outer cylinder 131, an inner cylinder 132 vertically slidably received in the outer cylinder 131, and a coil spring 133 disposed between the outer cylinder 131 and the inner cylinder 132 to bias the outer cylinder 131 downward. A motor 135 has its output shaft coupled to the top end of the inner cylinder 132 through a link 134 to vertically move the inner cylinder 132. The inner cylinder 132 carries a cylindrical blade 136 at its bottom and a suction member 137. Also, an annular plate 138 is vertically slidably mounted in the inner cylinder 132.

Rods 139 vertically movably extend through the inner cylinder 132. The annular plate 138 is fixed to the bottom ends of the rods 139. To the top ends of the rods 139 is fixed a frame 141. Coil springs 142 are fitted on the respective rods 139 between the inner cylinder 132 and the frame 141, biasing the annular plate 138 upward. The frame 141 has a small disk 143 kept in contact with a motor-driven cam 144. By rotating the cam 144 with a motor (not shown), the frame 141 and the annular plate 138 are moved up and down.

An annular member 145 is provided around the bottom end of the suction member 137. It comprises four split sections each carrying a heater 146 on the outer periphery. The split sections are pivotally hinged to the suction member 137 at points 147, and also coupled to the annular plate 138 through links 148. When the cam 144 rotates and the annular plate 138 begins to rise, the split sections of the annular member 145 spread apart by pivoting about the points 147.

The suction member 137 has a plurality of suction holes 151 in the bottom. An air supply passage 152 extends vertically through the suction member 137. It is connected to an air suction device (not shown) through an air hole 153 and a hose 154. By activating the air suction device, a suction force is applied to the suction holes 151 through the hose 154, air hole 153 and air supply passage 152.

The transparent sheet 123 is printed by the printer 126 when it passes by the printer. The printed portion of the sheet 123 is moved to and stopped in the area between the frame 121 and the cylinder 131. The tray 44-5 is then raised with a vial 12 placed thereon until the mouth of the vial 12 passes through a hole 155 in the frame 121 to press the edge of the mouth against the cylindrical blade 136 through the transparent sheet 123. The printed portion of the transparent sheet 123 is now in contact with the edge of the mouth of the vial 12.

In this state, a suction force is applied through the air passage 15 to the suction holes 152 to attract the transparent sheet 123 to the bottom surface of the suction member 137, and simultaneously the inner cylinder 132 is lowered to cut a circular piece out of the transparent sheet 123 with the cylindrical blade 136. At the same time, the annular plate 138 is lowered together with the annular member 145 at the same speed as the inner cylinder 132 to push the annular member 145 into the mouth of the vial 12. Since the annular plate 138 and the annular member 145 are lowered at the same speed as the inner cylinder 132, the split sections of the annular member 145 will not spread apart when pushed into the mouth of the vial 12. When the annular member 145 is pushed into the mouth of the vial 12, the edge of the circular sheet piece is pushed into the vial together with the annular member 145.

Then, with the inner cylinder 132 stopped at a predetermined position, the annular plate 138 is raised together with the annular member 145. Since the inner cylinder 132 is not raised, the split sections of the annular member 145 spread apart while being raised, so that the heaters 146 are pressed against the inner periphery of the vial 12 near its mouth through the circular piece of the transparent sheet 123. By temporarily heating the heaters 145 in this state, the circular piece of the transparent sheet 123 is fused to the inner periphery of the vial 12. The mouth of the vial 12 is thus sealed (FIG. 22). In FIG. 22, numeral 12x denotes the fused point.

Then, after separating the transparent sheet 123 from the suction member 137 by removing the suction force, the inner cylinder 132 is raised a little while keeping the annular plate 138 stationary to contract the split sections of the annular member 145. In this state, the inner cylinder 132 and the annular plate 138 are raised back to their original positions, while the tray 44-5 is lowered.

FIG. 23 shows a vial 12. A label 156 is stuck on its side. Its mouth is sealed by a sheet piece 157. The label 156 is one stuck by the labeller 7. The sheet piece 157 is formed by the transparent sheet sealer 8. The sheet piece 157 has a tab 157a formed by the cylindrical blade 136 simultaneously when cutting the sheet piece 157 out of the transparent sheet 123. That is, the cylindrical blade 136 has a tab-forming portion. A lid 158 is put on the mouth of the vial 12 by a pharmacist, a doctor or any other drug inspector to seal the vial.

The vial 12 and the cap 158 have a locking means for locking the cap 158 put on the vial (FIG. 24A). The locking means comprises a plurality of locking members 158a arranged circumferentially on the inner periphery of the cap 158 at predetermined intervals, a plurality of engaging pieces 12a provided on the outer periphery of the vial 12 along its top edge at predetermined intervals and adapted to engage the respective locking members 158a when the cap 158 is put on the vial, and a retaining member 158h for keeping the members 158a in engagement with the engaging pieces 12a. The retaining member 158h is movably provided inside of the cap 158 and includes an upper protrusion 158h1, a flange 158h2, and a lower cylindrical portion 158h3.

As shown in FIG. 24B, once the locking members 158a of the cap 158 engage the engaging pieces 12a of the vial 12, the protrusion 158h1 resiliently presses the flange 158h2 against the top of the vial 12 to push the members 158a into the recesses of the respective engaging pieces 12a so that even if the cap is turned in the opening direction, the locking members 158a cannot easily move over cam pieces (protrusions) of the engaging pieces 12a, thereby keeping the cap 158 locked.

FIG. 24B is a section of the vial 12 with the cap 158 put thereon, and shows a sealing sheet 157 having its top recessed like a tray. As mentioned above, its annular upright wall portion is fused to the inner surface of the vial 12. After the vial 12 is sealed with the sheet 157, the cap 158 is further put on the vial so that the sheet will not be broken by e.g. a child.

When the cap 158 is put on the vial 12, the cylindrical portion of the locking means is inserted into the vial. In order to prevent the cylindrical portion from interfering with the sheet, the sealing sheet 157 is recessed as shown.

Figure 25:
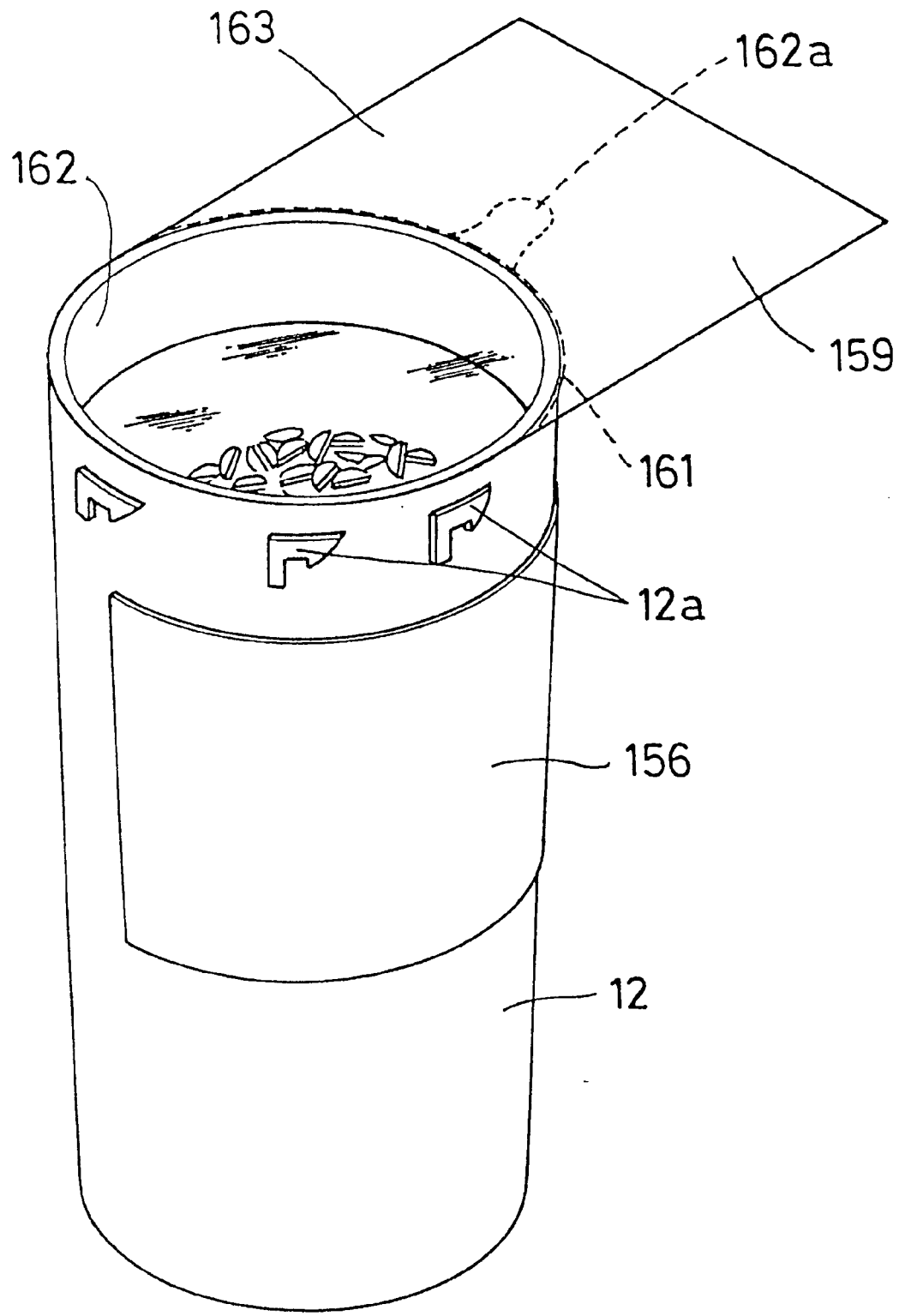
FIG. 25 is a perspective view of another type of vial stored in the apparatus of FIG. 1.

FIG. 25 shows a taller vial 12 and a different kind of sheet piece 159 than those shown in FIG. 23. Since the sheet piece 159 has a different shape from the sheet piece 157, the cylindrical blades 136 used to cut out the sheet pieces 157 and 159 have different shapes, too. The sheet piece 159 is cut out of a transparent sheet 123 having a perforated line 161 that divides the sheet into a sealing area 162 and a printing area 163. After sealing the mouth of the vial 12 with the sheet piece 159, the printing area 163 is pulled to tear the sheet piece 159 along the perforated line 161. By tearing the sheet piece 159, a tab 162a is formed along the edge of the sealing area 162.

FIGS. 26 and 27A–C show a sealing device 81 which is different from the sealing device 8. The sealing device 8 fuses the sealing sheet 157 to the inner vertical surface of the vial 12 near its top edge. In contrast, the sealing device 8' fuses the sealing sheet 157 to the top end face of the vial 12.

Figure 26:
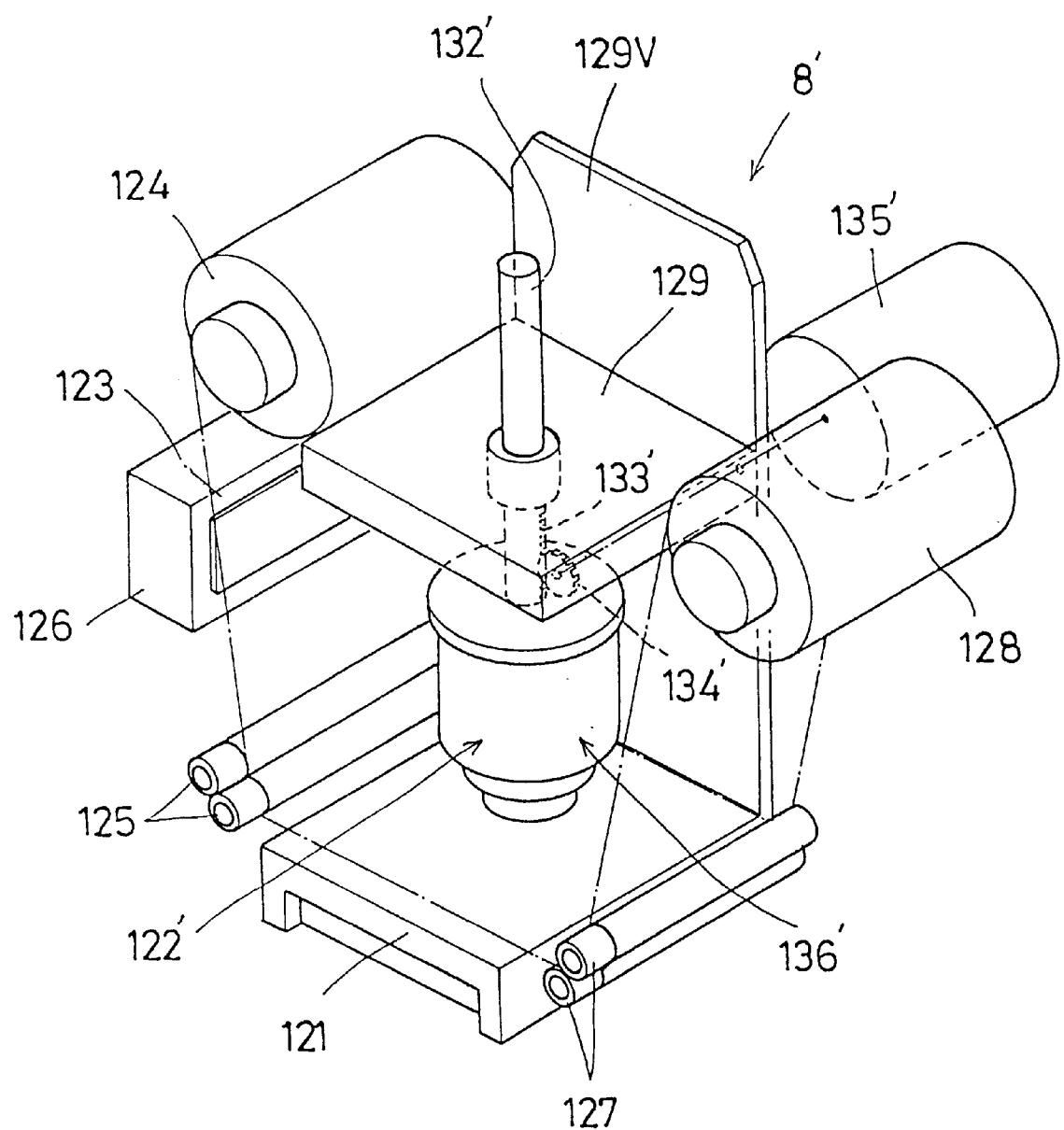
FIG. 26 is a perspective view of another transparent sheet sealing device.

As shown in FIG. 26, the sealing device 8' is similar to the device shown in FIG. 20 in that it has a cutting/fusing unit 122' provided over the table 121, and that the transparent sheet 123 is fed from the sheet feeding reel 124 through the printer 126, guide rollers 125, cutting/fusing unit 122', guide rollers 127 to sheet winding reel 128.

Referring again to FIG. 26, the cutting/fusing unit 122' is coupled to a support rod 132' vertically movably supported by a support frame 129 supported by a vertical plate 129V mounted on the table 121. The support rod 132' has a rack 133' in mesh with a pinion 134' coupled to a motor 135', so that the unit 122' is moved up and down by driving the pinion 134' by the motor 135'. The unit 122' has a cutting/fusing member 136' at its bottom.

Figure 27:
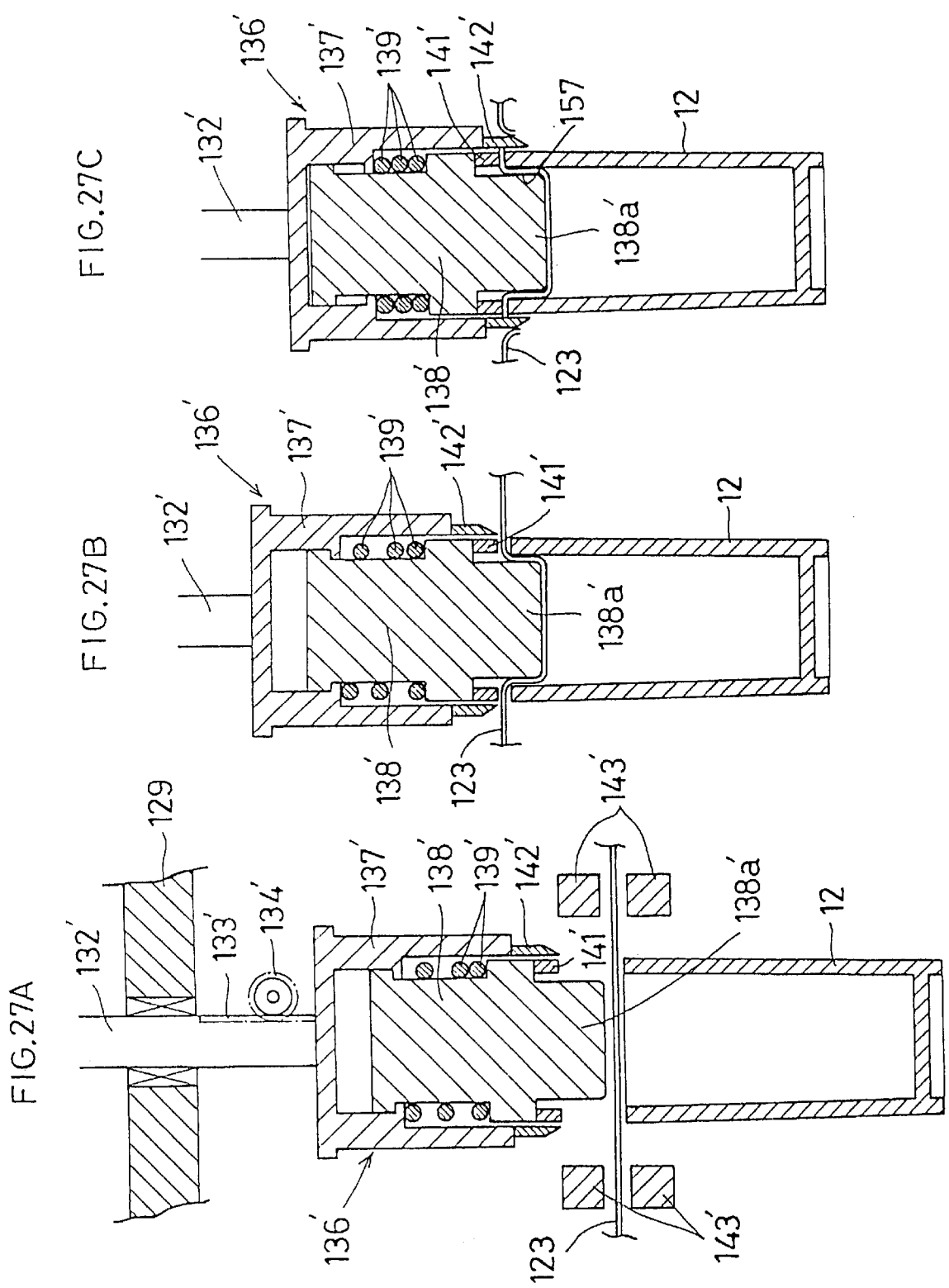
FIGS. 27A–27C are sectional views showing how the cutting/fusing member operates.

Referring to FIG. 27A, the cutting/fusing member 136' includes a hollow cylinder 137' in which is mounted a piston 138' so as to be movable longitudinally relative to the cylinder 137'. A spring 139' biases the piston 138' downward to normally protrude its bottom end 138a from the cylinder. The piston 138, has an upper large-diameter portion adapted to engage a shoulder formed on the inner periphery of the cylinder 137' to prevent the piston from coming out of the-cylinder.

The spring 139' is mounted between an intermediate large-diameter portion of the piston 138' and the shoulder of the cylinder 137'. The force of the spring 139' is greater than the reaction force when the transparent sheet 123 is pressed so that the piston may not be pushed back by such reaction force. A heater 141' is provided on a ring-shaped bottom of the intermediate large-diameter portion of the piston 138'. The cylinder 137' carries a cylindrical blade 142' on its bottom end.

The heater 141' and the cylindrical blade 142' have their bottom ends disposed at the same level. The protruding end 138a' of the piston 138' extends a predetermined distance downward from the bottom ends of the heater and the blade. In the stand-by position, the bottom end of the cutting/fusing member 136' is spaced a predetermined distance from the transparent sheet 123 on the table 121.

The cutting/fusing member 136' has no suction means or diameter-variable annular split members as shown in FIG. 20. Instead, as shown in FIG. 27A, it has two pairs of sheet grippers 143' at front and back sides thereof with respect to the feed direction of the sheet. If the cylindrical blade 142' has such a large diameter that the sheet cut out by the blade has a sufficiently greater diameter than the outer diameter of the top of the vial 12, the sheet grippers 143' are not necessary.

To form the sealing sheet 157 with the cutting/fusing unit 122', the member 136' is lowered from the stand-by position by driving the pinion 134' (FIG. 27B). The protruding end 138a' of the piston is thus pushed into the mouth of the vial 12, together with the transparent sheet 123, as shown in FIG. 27B. The sheet is thus recessed like a tray in conformity with the shape of the protrusion 138a'. The sheet is made of a stretchable chemical material.

As the member 136' further descends, the cylindrical cutter 142' cuts the transparent sheet 123 to form the circular sealing sheet 157. Then, the heater 141' touches the edge of the sheet 157 and presses it against the top edge of the vial 12. As the member 136'descends still further, the cutter 142' lowers to a level below the top of the vial 12, while the heater 141' cannot move downward any further because it abuts the top edge of the vial 12 with the sheet 157 therebetween (FIG. 27C).

Thus, after the heater 141' abuts the vial, only the cylinder 137' moves down while compressing the spring 139' because the piston cannot descend any further. In the state of FIG. 27C, the heater 141' is energized to fuse the sealing sheet 157 to the top edge of the vial 12.

Figure 28:
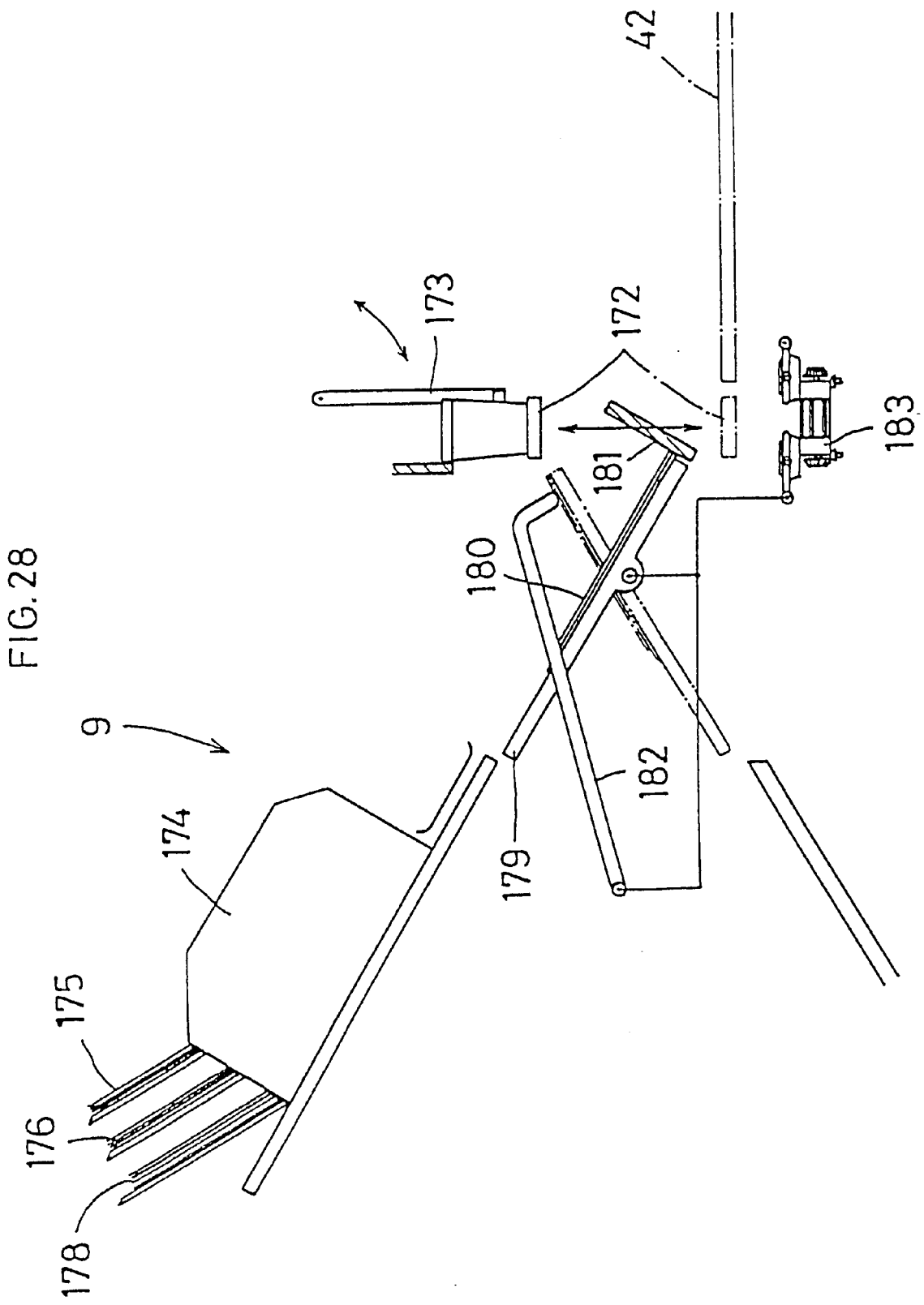
FIG. 28 is a schematic side view of the envelope dispenser of the apparatus shown in FIG. 1.
Figure 29:
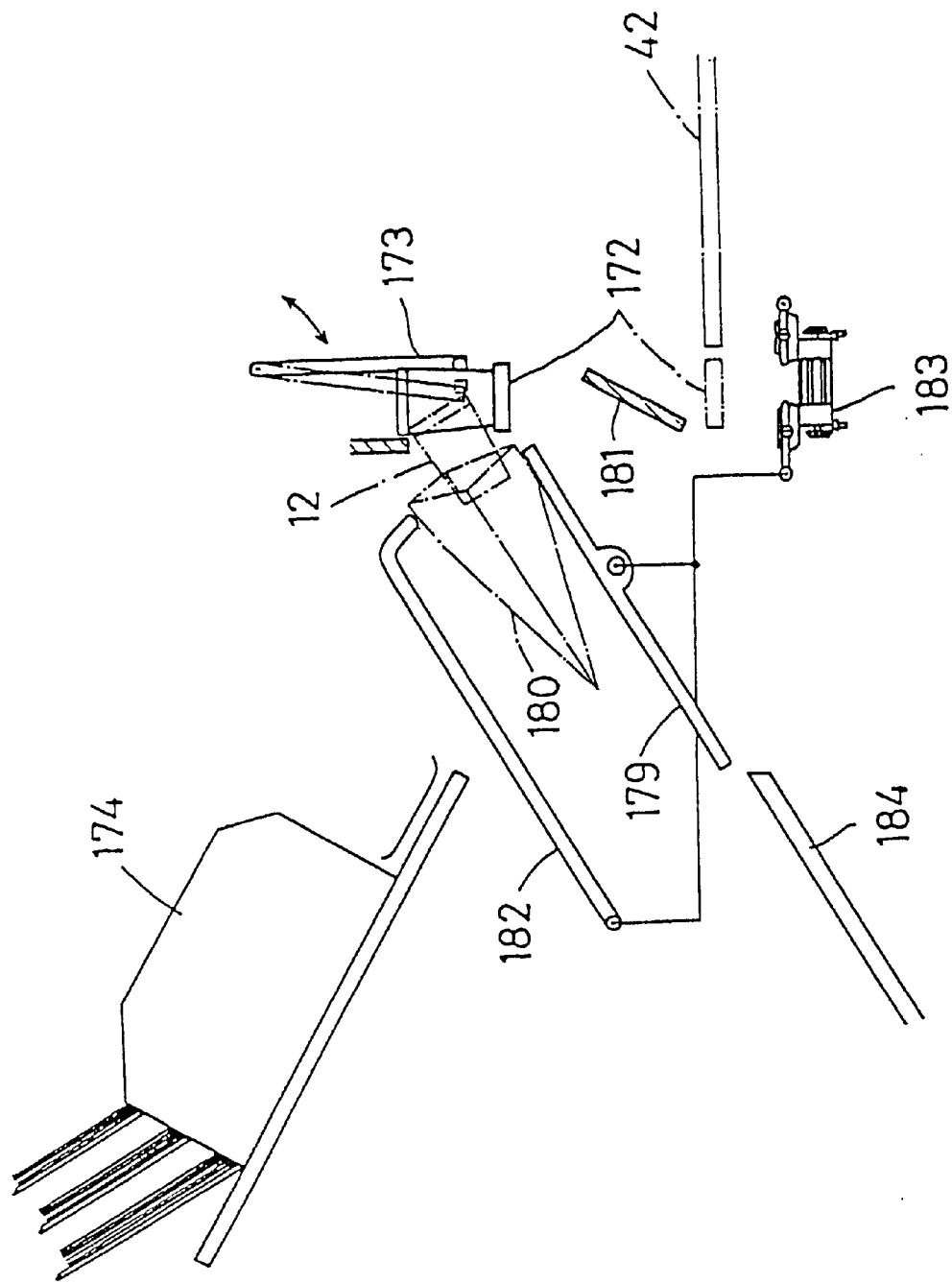
FIGS. 29 and 30 are side views showing the operation of the envelope dispenser of FIG. 28.
Figure 30:
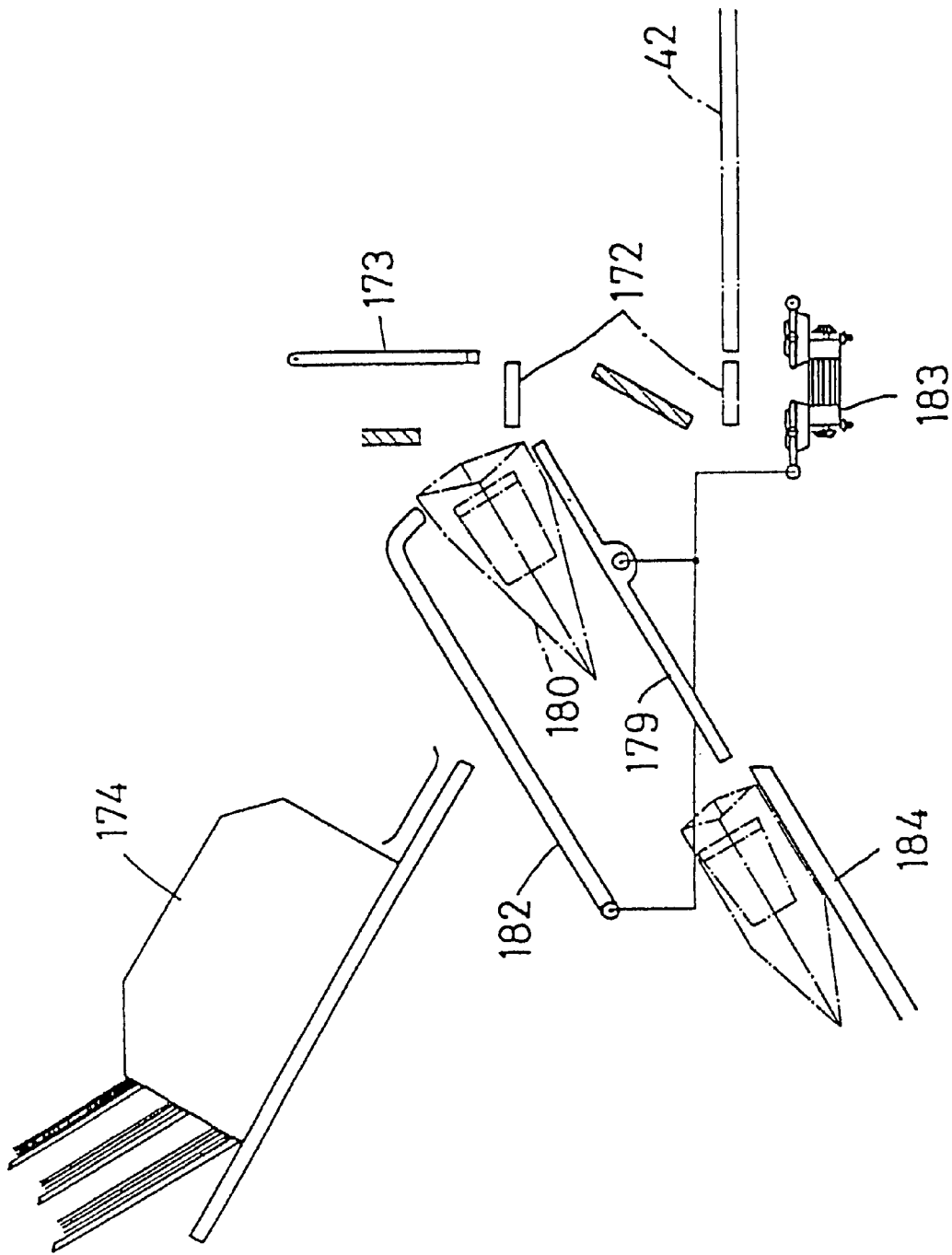

FIGS. 28 to 30 show the envelope dispenser 9. It receives each vial 12 being fed by the conveyor frame 58, held between its adjacent rungs 58a, on a elevator floor 172. The elevator floor 172 is then raised to the level of a pendulum 173.

An envelope selecting/printing unit 174 stores small envelopes 175, medium envelopes 176, and large envelopes 177. It selects one of the three sizes, prints necessary data on an envelope of the selected size, feeds the printed envelope to a pivot table 179. The envelope stops on the pivot table 179 by hitting its stop wall 181.

The pivot table 179 is supported substantially at its center so as to be pivotable between two oppositely inclined positions shown by solid and chain lines. A vacuum arm 182 has its lefthand end hinged so that its righthand end can swing up and down between two positions. The pivot table 179 and the vacuum arm 182 are connected to a vacuum device 183. By activating the vacuum device 183, air suction force is applied to the surface of the pivot plate 179 through many small holed formed in its surface and also to the righthand end of the vacuum arm 182.

By activating the vacuum device 183 after feeding an envelope 180 onto the pivot table 179 from the envelope selecting/printing unit 174, the envelope 180 is attracted to the pivot table 179. The pivot table 179 is then inclined to the position shown by chain line. In this state, by swinging the vacuum arm 182 to raise its righthand end, the mouth of the envelope 180 is opened as shown in FIG. 29. With the mouth of the envelope 180 opened, the pendulum 173 of the elevator is swung to tip the vial 12 on the elevator floor 172 into the envelope 180. By deactivating the vacuum device 183 in this state, the envelope 180, freed from the suction force, slides down the pivot plate 179 and a guide plate 184 onto an unshown table.

Figure 31:
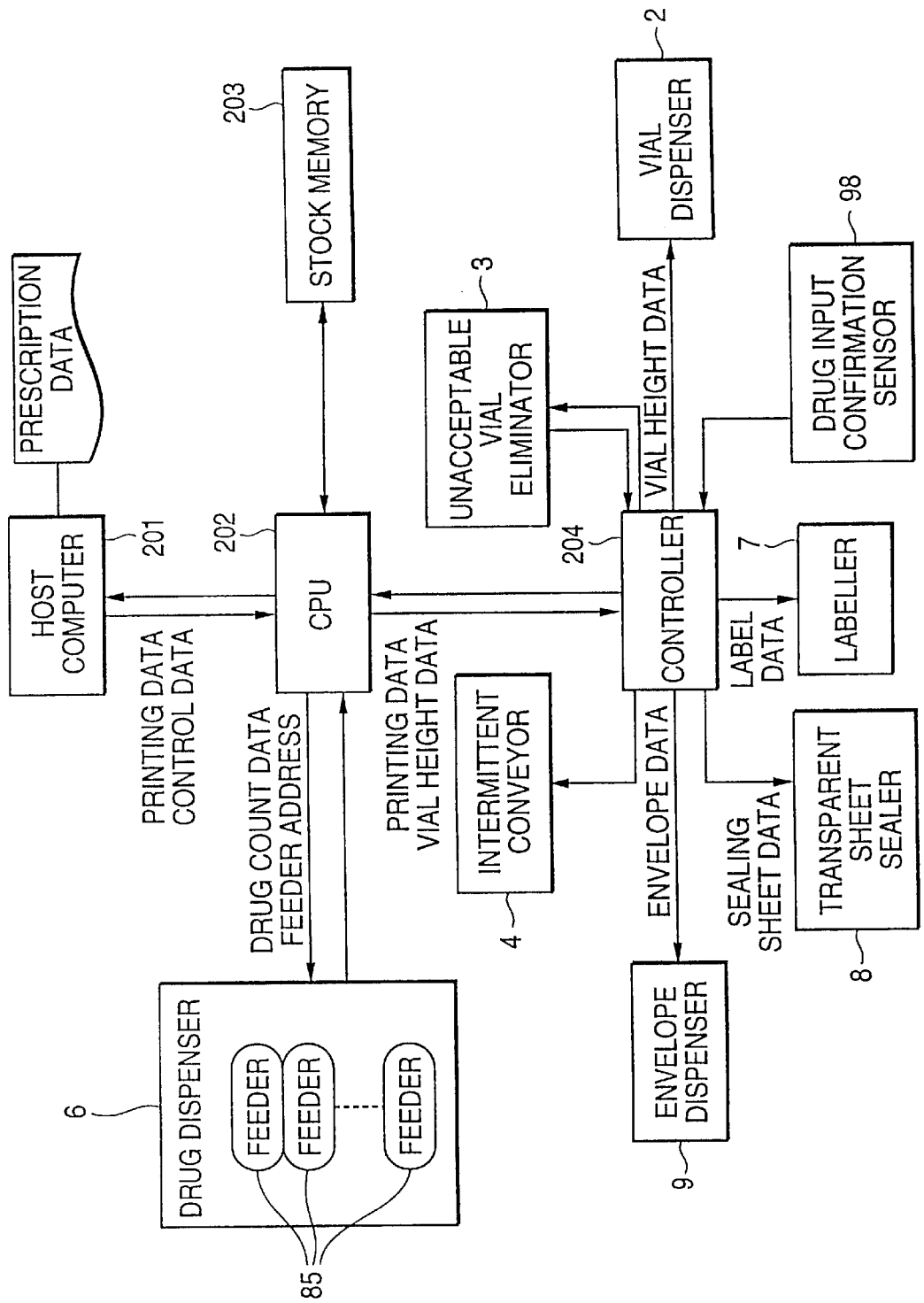
FIG. 31 is a block diagram of the control unit for the apparatus of FIG. 1.

FIG. 31 shows the control unit for the drug filling machine. Its host computer 201 is not a part of the drug filling machine but is a separate device. It inputs various data and instructions. A CPU 202, a stock memory 203 and a controller 204 are devices built in the drug filler machine. They control various units of the drug filling machine, i.e. the vial dispenser 2, intermittent conveyor 4, unacceptable vial eliminator 5, drug dispenser 6, labeller 7, transparent sheet sealer 8, and envelope dispenser 9.

Data transferred from the host computer 201 to the CPU 202 are printing data and control data. The printing data are label data, sealing sheet data and envelope data. The label data represent letters, characters and figures to be printed on labels. The sealing sheet data represent letters, characters and figures to be printed on sheet pieces. The envelope data are data on letters and characters to be printed on envelopes. The control data include feeder addresses, drug count data and data on vial heights. Each feeder address designates one of the feeders 85 in the drug dispenser 85. The drug count data designate the number of drugs to be fed into each vial 12. The vial height data designate the kind of the vial 12 to be dispensed.

Data transferred from the CPU 202 to the controller 204 are all of the printing data, i.e. the label data, sealing sheet data and envelope data, and part of the control data, i.e. the vial height data. The controller 204 controls the labeller 7, transparent sheet sealer 8, envelope dispenser 9, and vial dispenser 2 based on the label data, sealing sheet data, envelope data, vial height data, respectively.

FIG. 32 through 34 show various data stored in the host computer 201.

Drug data 211 shown in FIG. 32 comprise the name, shape, color, components, weight, directions for use, side effects, first maximum amount, second maximum amount, third maximum amount and fourth maximum amount for each kind of drugs. For example, in the first line, the following data are stored: GASTOR (drug name), drum-shaped, red, 2 grams, take three times a day after each meal, sleepiness, 50, 100, 150, 200. The first maximum amount, second maximum amount, third maximum amount and fourth maximum amount indicate the maximum numbers of drugs that can be put in each of the shortest vials 12-4, the second shortest vials 12-3, the second tallest vials 12-2 and the tallest vials 12-1, respectively.

Patients' data 212 shown in FIG. 33 comprise the name, address, age, sex, department, name of a disease, symptom, allergy, category and ward name for each patient to whom drugs are administered. For example, the following data are stored in the first line: Yuyama Taro, Osaka-machi 1-chome 1-ban, 48, male, internal, influenza, fever, pollinosis, 1, 2nd floor East Ward. Here, the numbers "1 and 2" in the "category" section indicate inpatients and outpatients, respectively.

Feeder data 213 shown in FIG. 34 comprise the name and number of drugs stored in each feeder 85 in the drug dispenser 6 designated by each feeder address, and the maximum number of drugs each feeder 85 can store. For example, the following data are stored in the first line: feeder address, 796, 1000.

FIG. 35 shows stock data 214 stored in the stock memory 203 in the drug filling machine. The stock data 214 comprise the number of drugs stocked in each feeder 85 designated by each feeder address and the priority order for each feeder. Of the feeders 85 that store the same kind of drugs, higher priority is given to feeders 85 that store larger numbers of drugs.

FIG. 36 shows a table 215 in which are written prescription data to be displayed on the CRT of the host computer 201. It includes a patient data entry column, a category entry column, a doctor's name entry column and a drug data entry column. For example, data shown in FIG. 34 are written in this table.

The drug filling machine is controlled in the following manner.

[Inputting Prescription Data]

Prescription data are written in the table 215 displayed on the CRT and at the same time inputted in the host computer 201 by operating the keyboard of the host computer 201. Such prescription data include the patient's name, address, age, etc., and the name, number, etc. of drugs administered to the patient.

[Creating Printing Data and Control Data]

Printing data and control data are created based on the prescription data, drug data 211, patient data 212 and feeder data 213. These data are transferred from the host computer 201 to the CPU 202. The CPU 202 transfers printing data and the vial height data in the control data to the controller 204.

[Dispensing Vials]

Upon receiving the printing data and the vial height data, the controller 204 activates the vial dispenser 2 to select vials 12 of the height designated by the vial height data from among the four kinds of vials 12-1–12-4 and take out one of them. The vial 12 taken out is delivered to the vial erecting unit 3, which deposits the vial on the first tray 44-1 of the intermittent conveyor 4.

[Eliminating Any Unacceptable Vial]

When the vial 12 is placed on the first tray 44-1 by the vial erecting unit 3, the controller 204 lowers the tray 44-1, and sends the vial 12 onto the second tray 44-2, where the height of the vial 12 is measured by the vial height sensor 67. The controller 204 compares the height measured by the sensor 67 with the height in the vial height data. If they do not coincide, the controller raises the tray 44-2, and activates the unacceptable vial eliminator 5 to push it off the feed line.

[Feeding the Vial]

If the height measured by the sensor 67 coincides with the height in the vial height data, the controller 204 activates the intermittent conveyor 4 to send the vial 12 onto the third tray 44-3. At the same time, the controller 204 activates the drug dispenser 6 through the CPU 202. Namely, the CPU 202 controls the drug dispenser 6 based on the feeder address and the drug count data, which are contained in the control data.

More specifically, the CPU 202 activates the feeder 85 in the drug dispenser 6 designated by the feeder address to discharge drugs from the feeder by the number designated in the drug count data. The drugs discharged drop into the hopper 73, and then from the hopper 73 into the vial 12 on the tray 44-3.

[Sticking a Label]

When the vial 12 is filled with the drugs, the controller 204 activates the intermittent conveyor 4 to send the vial onto the fourth tray 44-4, and raises the tray 44-4. The controller 204 then activates the labeller 7 to print letters, characters and figures designated in the label data as the printing data on a label, and stick this label on the side wall of the vial 12 on the tray 44-4.

[Sealing the Vial]

After sticking the label, the controller 204 activates the intermittent conveyor 4 to send the labelled tray 12 onto the fifth tray 44-5, and raises the tray 44-5. The controller 204 then activates the transparent sheet sealer 8 to print letters, characters and figures designated in the sealing sheet data as the printing data on a transparent sheet 123, and seal the mouth of the vial 12 with the sheet piece cut out of the transparent sheet 123.

[Putting the Vial in an Envelope]

After sealing the vial 12, the controller 204 activates the intermittent conveyor 4 to send the sealed vial 12 onto the elevator floor 172, and raises the floor 172 to raise the vial 12. The controller 204 then activates the envelope selecting/printing unit 174 of the envelop dispenser 9 to select on of the large, medium and small envelopes 175, 176 and 177, print letters and characters designated in the envelope data as the printing data on the selected envelope, and open the mouth of the envelope. The vial on the floor 172 pushed into the envelope.

The above operation is repeated for each vial.

When a vial 12 is fed from the first tray 44-1 to the second tray 44-2, other four vials 12 may be sent onto the first tray, and third to fourth trays 44-3–44-5. Thus, it is possible to process a maximum of five vials concurrently at the five processing stations.

We will now describe the abovementioned process steps more in detail.

Figure 38:
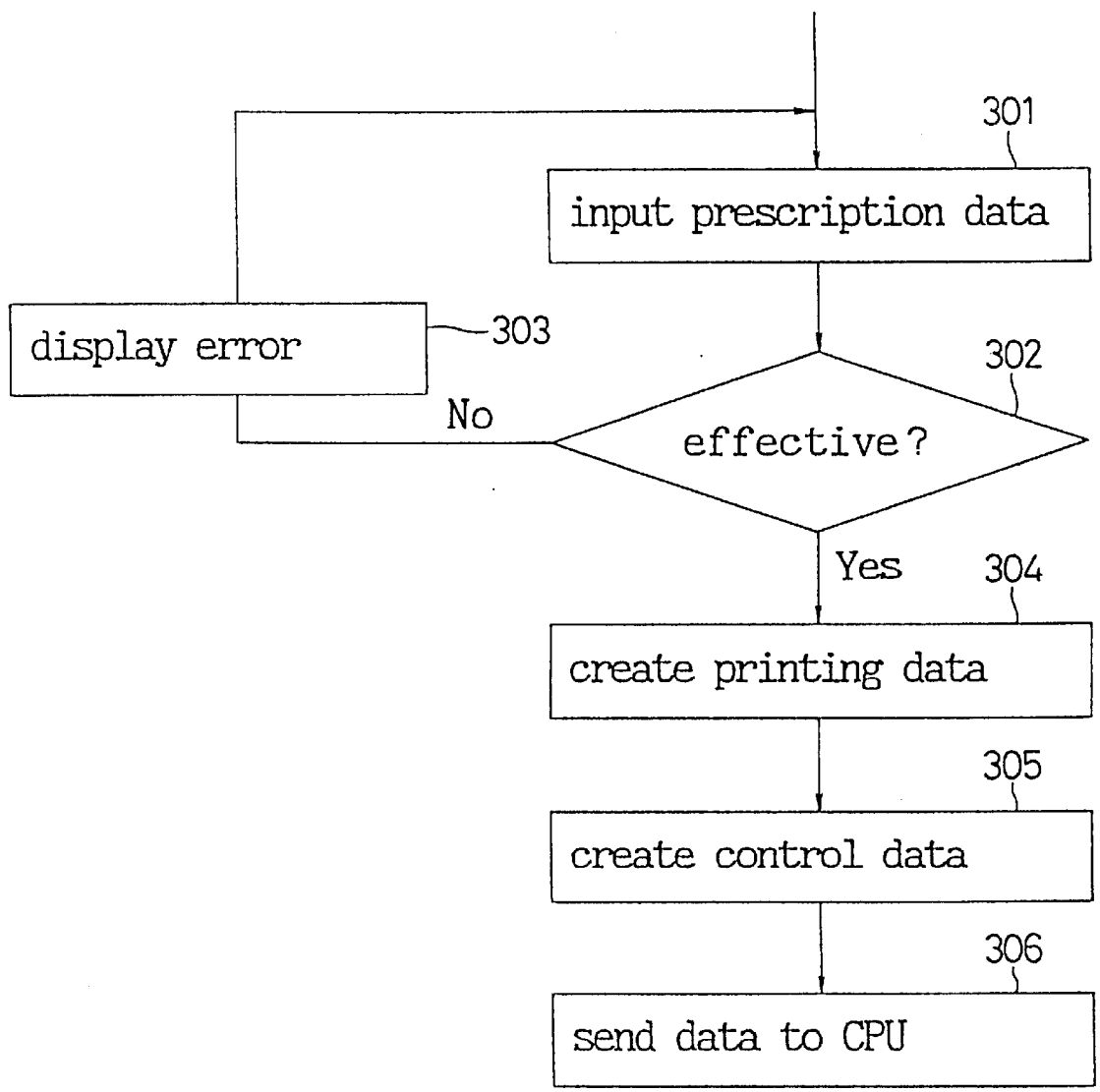
FIG. 38 is a flowchart showing the steps of (inputting prescription data) and (creating printing data and control data) in the control unit of FIG. 31.

First, referring to FIG. 38, description is made of the steps of (inputting prescription data) and (creating printing data and control data).

The table 215 is displayed on the CRT of the host computer 201. The data shown in FIG. 37 are written in the table 215 (Step 301). In this particular example, patient's name "Yuyama Taro", sex "male", age "48", department "internal", ward name "2nd floor East Ward" are written in the patient data entry column 216 of the table 215. To write these data in the patient data entry column 216, the patient data 212 shown in FIG. 33 are read out and the line headed by "Yuyama Taro" is designated. Then, the host computer 201 reads out the line headed by "Yuyama Taro" in the patient data 212 and writes it in the patient data entry column 216. Similarly, number "1", which indicates an inpatient, or "2", which indicates an outpatient, is entered into the category entry column 217.

In the doctor's name entry column 218 and the drug data entry column 219 in the table 215, the doctor's name such as "Yasuoka Keita" and the name and number of drugs administered to the patient are entered by operating the keyboard.

After entering necessary data in the table 215, the host computer 201 determines whether or not the prescription data are valid (Step 302). If, for example, a pre-registered doctor's name is not entered in the doctor's name entry column 218, or if a wrong drug name that has not been pre-registered is entered, the computer 201 determines that the prescription data are invalid (No in Step 302). In this case, after indicating an error message (Step 303), the computer 201 returns to Step 301. If the prescription data is found out to be valid (Yes in Step 302), the host computer 201 creates printing data and control data (Steps 304, 305).

The printing data comprise the abovementioned label data, sealing sheet data and envelope data. The label data are created for each drug name in the prescription data, and comprise patient's name, drug name and number of drugs that are read from the prescription data, and directions for use that are read from the line corresponding to the drug name in the drug data shown in FIG. 29. These data are later printed on a label to be stuck on each vial 12. For example, the label data may comprise: "Yuyama Taro", "Gaster", "4000", "three times a day after each meal".

The sealing sheet data are created for each drug name in the prescription data, and comprise drug name, number of drugs, shape, color and components of drugs that are read from the line corresponding to the drug name in the drug data 211, and patient's symptom and allergy that are read from the patient data shown in FIG. 33. These data are later printed on each sheet piece. For example, the sealing sheet data may comprise: "Gaster", "4000", "drum-shaped", "red", "Gastamin (drug name)", "pollinosis", etc.

Figures may be used to symbolize the shape and color of drugs. For this purpose, photos of drugs are converted to digital images, simplified by processing them, and stored in a memory.

The envelope data are created for each prescription data, and comprise patient's name, drug name, and patient's address read from the patient data 212. These data are later printed on each envelope for keeping vials 12. For example, the envelope data may comprise: "Yuyama Taro", "Osakamachi 1-chome 1-ban", "Gaster", etc.

The control data comprise the abovementioned feeder addresses, drug count data, vial height data, etc. Feeder addresses correspond to each drug name and are obtained by searching the feeder data 213 shown in FIG. 31. For example, for the drug name "Gaster", three addresses "A-01", "A-02" and "A-03" are read form the feed feeder data 213. The fact that a plurality of addresses are set for one kind of drugs means that these single kinds of drugs are stored in a plurality of feeders 85 in the drug dispenser 6.

The drug count data are determined for each drug name written in the drug data entry column 219. They are read from the prescription data. For example, the prescription data say the number of drugs "Gaster" is 40. Thus, the drug count data for "Gaster" is set at "40".

The vial height data designate the height of vials for each drug name. They are determined based on the number of drugs to be put in a vial while referring to the first to fourth maximum drug amounts in the drug data 211. For example, for the drug name "Gaster", 40 drugs have to be put in a vial. Since the number 40 is smaller than the first maximum amount, i.e. 50, a shortest vial 12-4 is selected.

Once the printing data and control data are determined, the host computer 201 sends these data to CPU 202 of the drug filling machine (Step 306).

The CPU 202 sends the printing data and the vial height data in the control data to the controller 204.

Figure 39:
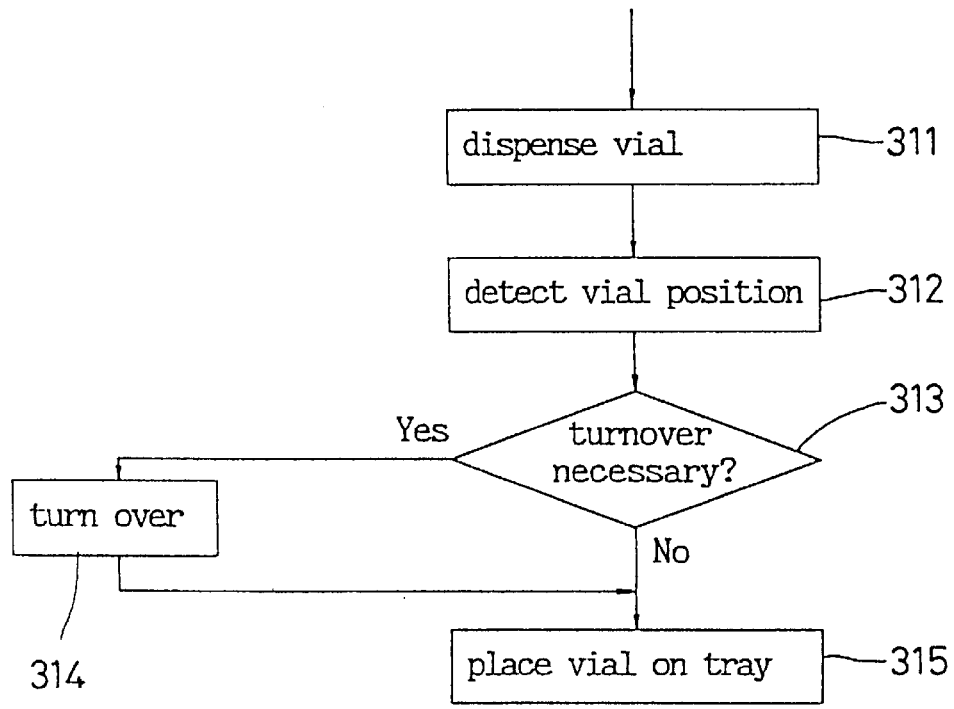
FIG. 39 is a flowchart showing the step of (discharging vials) in the control unit of FIG. 31.

Then, vials are taken out following the steps shown in the flowchart of FIG. 39.

Upon receiving the printing data and the vial height data in the control data, the controller 204 activates the vial dispenser 2 (Step 311). If the vial height data designate a shortest vial 12-4, the vial dispenser 2 takes one of the shortest vials 12-4 out of the vial storage frame 11-4 or 11-5. The controller 204 detects the position of the vial 12-4 thus taken out by activating the distance sensor 16 of the corresponding frame 11.

When this vial 12-4 is fed to the vial erecting unit 3 by the vial dispenser 2, the controller 204 determines whether it is necessary to turn over the vial based on the information from the distance sensor 16, and activates the vial erecting unit 3 (Step 313) to feed the vial 12-4 onto the first tray 4-1 of the intermittent conveyor 4 after turning it over (Step 314) or without turning it over (Step 315). The vial 12-4 is thus placed on the first tray 4-1 with its mouth up.

In this state, the controller 204 lowers the tray 44-1, and moves the conveyor frame 58 to send the vial 12-4 onto the second tray 44-2.

Figure 40:
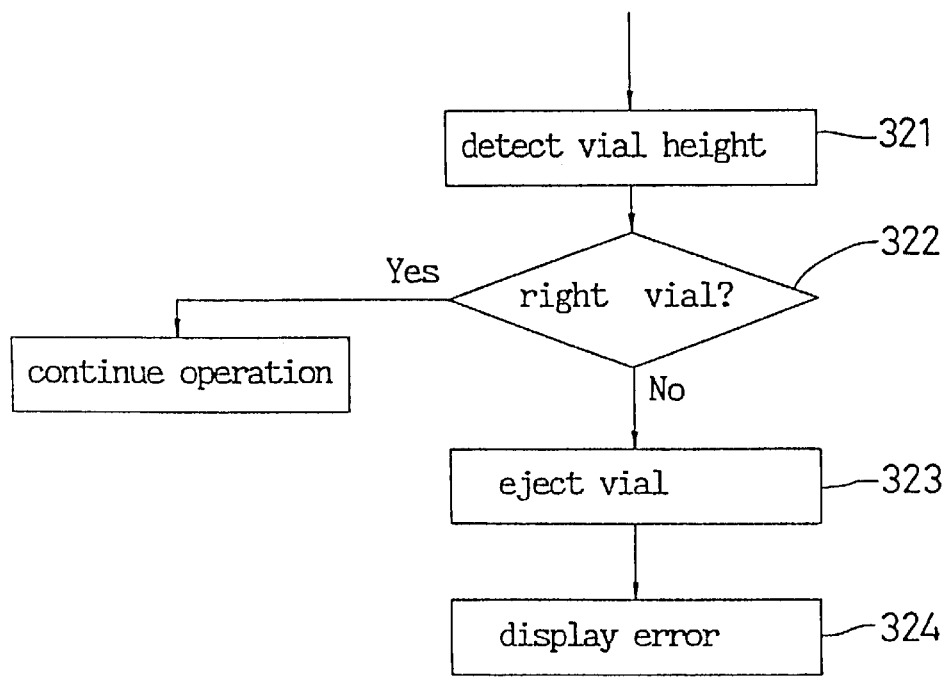
FIG. 40 is a flowchart showing the step of (eliminating unacceptable vials) in the control unit of FIG. 31.

Any unacceptable vial is eliminated following the steps shown in the flowchart of FIG. 40.

First, the controller 204 measures the height of the vial 12-4 by activating the vial height sensor 67 (Step 321) and compares this measured height with the height determined by the vial height data to determine whether or not the vial 12-5 is of the right height (Step 322). If the vial is of the right height (Yes in Step 322), the motor 65 of the unacceptable vial eliminator 5 is not activated. If the vial is not of the right height (No in Step 322), after raising the second tray 44-2, the U-shaped frame 62 is moved to the vial 12 on the tray 44-2 to push it down onto the slider 69 (Step 323). The controller 204 then stops the entire machine and sends an "error message" to the host computer 201 through the CPU 202. The host computer 201 displays the "error message" on the CRT (Step 324).

If the vial 44-2 is the right one, the controller 204 lowers the tray 44-1 and moves the conveyor frame 58 to send the vial 12-4 onto the third tray 44-3.

Figure 41:
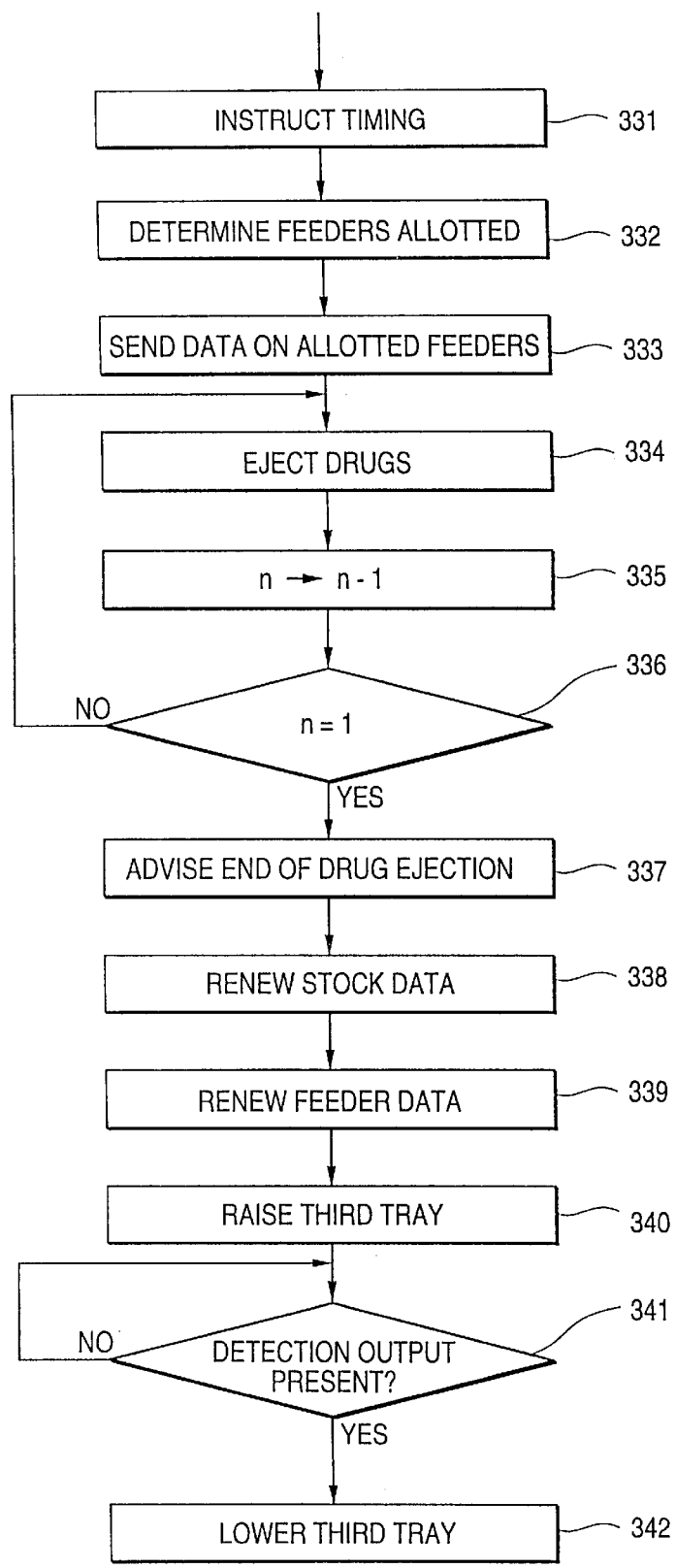
FIG. 41 is a flowchart showing the step of (discharging drugs) in the control unit of FIG. 31.

Drugs are put in the vial following the steps shown in the flowchart of FIG. 41.

First, the controller 204 commands the CPU 202 to activate the drug dispenser 6 (Step 331).

In response, the CPU 202 determines, based on the feeder addresses "A-01", "A-02" and "A-03", and the drug name "Gaster" contained in the control data, how many of the 40 drugs are to be taken out of the respective feeders designated by the above feeder addresses (Step 332). Specifically, the CPU 202 reads the priority orders "3", "1" and "2" corresponding, respectively, to the feeder addresses "A-01", "A-02" and "A-03" (which means that the feeder "A-02" stores the largest number of drugs of the three feeders) out of the stock data 214 in the stock memory 203 (shown in FIG. 32). The CPU 202 then divides the number of drugs "Gaster", i.e. 40, by the number of the feeder addresses, which is 3, (40÷3=13 . . . 1), and takes 14 (quotient 13 plus residue 1) drugs out of the first-priority feeder (address A-02) and 13 each drugs out of the second- and third-priority feeders (addresses "A-01" and "A-03".

If the drugs to be taken out are stored in a single feeder, the priority number for this feeder is "0". For example, the priority number "0" is assigned to the feeder address "A-04". Thus, if the priority number is "0", all the drugs designated by the drug count data are taken out of a single feeder such as the feeder "A-04".

The CPU 202 then activates the feeders 85 in the drug dispenser 6 corresponding to the feeder addresses "A-01", "A-02" and "A-03" to discharge 13, 14 and 13 drugs from the respective feeders (Step 333).

Specifically, the CPU 202 controls the feeders 85 to discharge drugs one by one (Step 334). Every time the drug sensor 94 of each feeder detects the passage of drugs, the numbers n1, n2 and n3 of drugs to be discharged from the respective feeders, which are initially 13, 14 and 13 respectively, are counted down (Step 335). The respective feeders keep discharging drugs until the numbers n1, n2 and n3 become zero (Yes in Step 336), i.e. until 13, 14 and 13 drugs have been discharged from the feeders 85 corresponding to the feeder addresses "A-01", "A-02" and "A-03". A total of 40 drugs discharged from the three feeders drop into the hopper 73 and are collected in the central part of the hopper 73.

When the numbers n1, n2 and n3 have been counted down to zero (Yes in Step 336), the CPU 202 notifies this fact to the controller 204 (Step 337).

If the drug sensor 94 of any feeder 85 fails to detect the passage of drugs even though the feeder is activated to discharge drugs several times, the CPU 202 sends an "error message" to the host computer 201 and the controller 204. In response, the host computer 201 displays the "error message" on the CRT, while controller 204 deactivates the drug filling machine.

When the numbers n1, n2 and n3 have been counted down to zero, the CPU 202 renews the stock data 214 in the stock memory 203 (Step 338). Namely, 13, 14 and 13 are subtracted from the old stock numbers 315, 430 and 408 corresponding to the feeder addresses "A-01", "A-02" and "A-03", respectively to renew the stock numbers to 302, 416 and 395. Based on these numbers, priority order is renewed.

The CPU 202 sends the renewed stock numbers 302, 416 and 408 as well as the feeder addresses "A-01", "A02" and "A-03" to the host computer 201. In response, the host computer 201 renew the stock numbers corresponding to the feeder addresses "A-01", "A-02" and "A-03" in the feeder data 213 (Step 339).

When the controller 204 receives the Step 337 notification, it raises the third tray 44-3 of the intermittent conveyor 4 (Step 340). By raising the tray 44-3, the vial 12-4 thereon pushes up the cylinder 75 at the bottom end of the hopper 73. When the hole 76 aligns with the discharge port 74, the 40 drugs are discharged through discharge port 74 and the hole 76 into the vial 12-4. When the sensor 95 detects the top end of the cylinder 75 (Yes in Step 341), the tray 44-3 is stopped and then lowered (Step 342).

After filling the tray 12-4 with the 40 drugs and lowering the tray 44-3, the controller 204 moves the conveyor frame 58 of the intermittent conveyor 4 to send the vial 12-4 onto the tray 44-4. The tray 44-4 is then raised.

Figure 42:
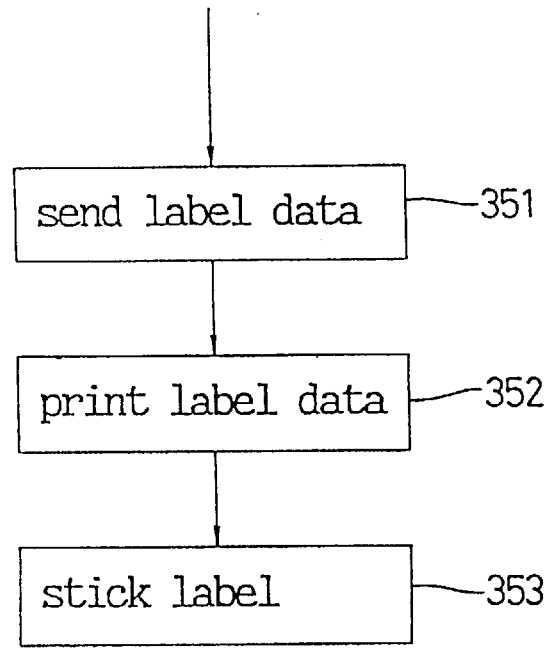
FIG. 42 is a flowchart showing the step of (sticking a label) in the control unit of FIG. 31.

A label is stuck on the vial following the steps shown in flowchart of FIG. 42.

First, the controller 204 activates the printer 104 of the labeller 7 based on the label data in the printing data (Step 351). The label data may comprise e.g. "Yuyama Taro", "Gaster", "4000", "three times a day after each meal".

In the labeller 7, the label data are printed on a label 156 on the label sheet 102 while feeding the label sheet 102 (Step 352). The printed label 156 is peeled off the label sheet 102 in the manner described above, guided into between the sponge roller 114 and the vial 12-4, and stuck on the vial 12-4 (Step 353). Namely, the label 156 on which are printed the data, "Yuyama Taro", "Gaster", "4000", "three times a day after each meal" is stuck on the vial 12-4.

The controller 204 then lowers the tray 44-4, moves the conveyor frame 58 to send the vial 12-5 onto the fifth tray 44-5, and raise the tray 44-5.

Figure 43:
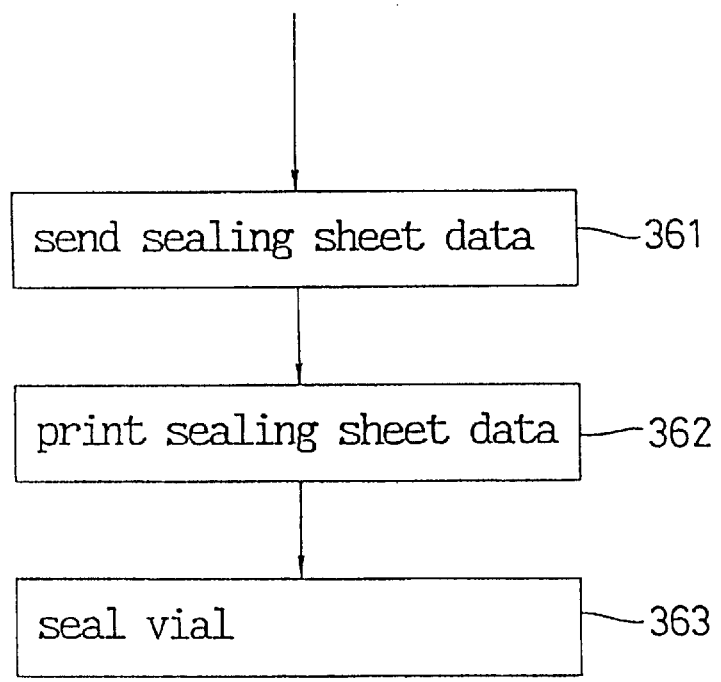
FIG. 43 is a flowchart showing the step of (sealing a vial) in the control unit of FIG. 31.

The vial is then sealed following the steps shown in the flowchart of FIG. 43.

First, the controller 204 activates the printer 126 of the transparent sheet sealer 8 based on the sealing sheet data in the printing data (Step 361). The sealing sheet data may comprise e.g. "Gaster", "4000", "drum-shaped", "red", "Gastamin", "pollenosis", etc.

In the transparent sheet sealer 8, the sealing sheet data are printed on the transparent sheet 123 while feeding the transparent sheet 123 (Step 362). The controller 204 then moves the transparent sheet 123 to cover the mouth of the vial 12-4 with the printed portion of the sheet 123, cuts a sheet piece out of the sheet 123, and fuses the sheet piece to the mouth of the vial 12-4 to seal the mouth of the vial 12-4 (Step 363).

The sealing sheet data are printed over the entire area of the sheet piece shown in FIG. 23. In the case of the sheet piece shown in FIG. 25, which is divided into the sealing area 162 and the printing area 163, the sealing sheet data are printed only on the printing area 163.

After sealing the mouth of the vial 12-4, the controller 204 lowers the tray 44-5 and moves the conveyor frame 58 to send the vial 12-4 onto the elevator floor 172.

Figure 44:
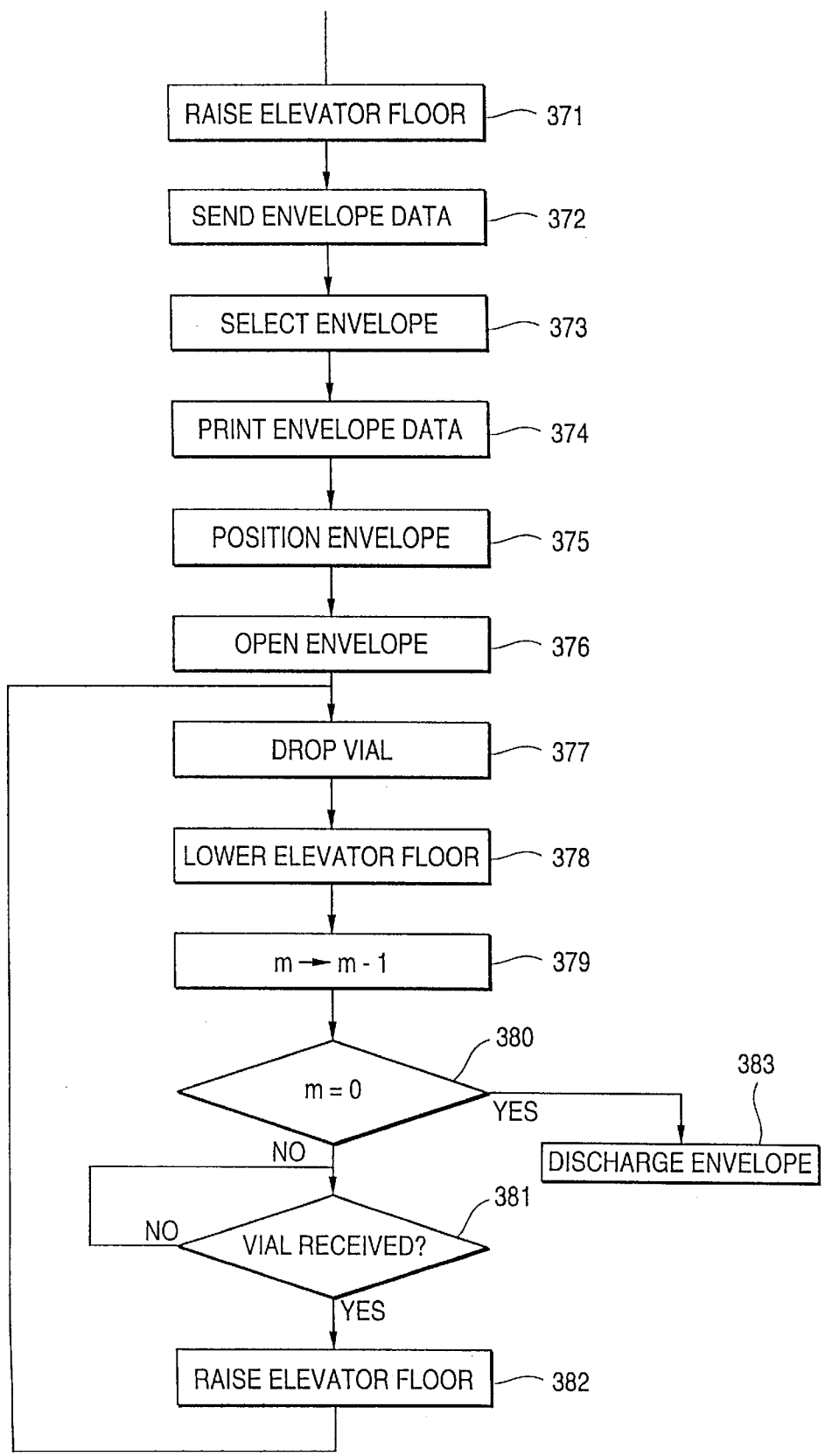
FIG. 44 is a flowchart showing the step of (putting vials in an envelope) in the control unit of FIG. 31.

The vial is then put in an envelope following the steps shown in the flowchart of FIG. 44.

First, the controller 204 activates the elevator of the envelope dispenser 9 to raise the floor 172 to the level of the pendulum 173 with the vial 12-4 placed thereon (Step 371).

The controller 204 then activates the envelope selecting/printing unit 174 of the envelope dispenser 9 based on the envelope data in the printing data. The envelope data comprise e.g. "Yuyama Taro", "Osaka-machi 1-chome 1-ban", "Drug A", "Drug B", "Drug C", "Drug D", "Drug E", etc.

The controller 204 selects one of the small envelopes 175, medium envelope 176 and large envelope 177 in the envelope selecting/printing unit 174 according to the number of the drug names designated in the envelope data (Step 373). If, for example, two or less drug names are designated in the envelope data, a small envelope 175 is selected. If the envelope data list three or four drug names, a medium envelope 176 is selected. If more four drug names are listed, a large envelope 177 is selected. In the example shown, the envelope data contain five different drug names, so that the controller 204 selects a large envelope 177 by controlling the envelope selecting/printing unit 174. Namely, the envelope selecting/printing unit 174 pulls out a large envelope 177, print the data "Yuyama Taro", "Osaka-machi 1-chome 1-ban" and the drug names on the large envelope 177 (Step 374), and feed the thus printed envelope 177 onto the pivot table 179 (Step 375).

In this state, with the large envelope 177 attracted to the pivot table 179 by activating the vacuum device 183, the pivot table 179 is inclined, the mouth of the large envelope 177 is opened with the vacuum arm 182 (Step 376), and the pendulum 173 of the elevator is swung to push the vial 12-4 on the elevator floor 172 into the large envelope 177 (Step 377). The elevator floor 172 is then lowered (Step 378).

The controller 204 then counts down the number m of the drug names in the envelope data (Step 379). If the number m is still not zero (No in Step 380), the envelope dispenser 9 is kept in this position to receive the next vial, which is sent from the fifth tray 44-5 of the intermittent conveyor 4 onto the elevator floor 172 (Step 381).

When the next vial, containing drugs called "Gaster" with a label 156 stuck thereon and its mouth sealed by a sheet piece 157, is sent from the fifth tray 44-5 onto the elevator floor 172 (Yes in Step 381), the controller 204 raises the elevator floor 172 (Step 382).

The controller 204 then activates the pendulum 173 again to push the vial 12 on the floor 172 into the large envelope 177 (Step 377), and lowers the elevator floor 172 (Step 378).

Similarly, every time each drug and written in prescription data is put into the envelope, the number m is counted down (Step 379). While the number is still not zero (No in Step 381), the controller fills the designated drugs into a next vial 12, sticks a label on the vial, and seals the vial with the sheet piece 157. When the labelled and sealed vial is delivered onto the elevator floor 172 (Yes in Step 381), it is raised (Step 382). The vial 12 is then pushed into the large envelope 177 (Step 377). When the vial containing the last drugs have been put in the envelope, the number m is counted down to zero (Yes in Step 380). The controller then proceeds to Step 383.

In Step 383, the controller 204 deactivates the vacuum device 183 of the envelope dispenser 9 to discharge the large envelope on the pivot table 179 onto the guide plate 184 and then onto the external table. The large envelope 177 thus discharged is inspected by a pharmacist, a doctor or any other drug inspector. To inspect the vial 12 shown in FIG. 23, an inspector sees through the sheet piece 157 to check if the drugs in the vial are right ones by comparing the sealing sheet data printed on sheet piece 157, i.e. the name, number, shape, color and composition of drugs, and data on the patient's symptom and allergy, with the information obtained by actually seeing the drugs in the vial through the sheet piece 157. Then, each vial 12 is capped to close its mouth.

Since the mouth of the vial 12 is sealed with the sheet piece 157, no dust or foreign matter will mix into the vial 12 even if a rather long time is taken until the vial is inspected. Since the sheet piece 157 is transparent, a drug inspector can easily see and check the drugs in the vial through the sheet 157. All the data necessary for doctors and pharmacists are printed on the sheet piece 157, while all the necessary information for the patient is printed on the label 156. Thus, by reading only what is printed on the label 156, the patient can obtain all the information necessary for him without confusion or misunderstanding.

The sheet piece 159 shown in FIG. 25 is divided into the sealing area 162 for sealing the mouth of the vial 12 and the printing area 163 located outside the edge of the mouth of the vial. The sealing sheet data are printed on the printing area 163. After inspecting the contents of the vial, the drug inspector cuts off the printing area 163 along the perforated line 161. Thus, anyone can easily distinguish inspected vials from uninspected ones.

In Steps 337, 338 and 339 shown in the flowchart of FIG. 38, every time drugs are discharged from feeders 85 of the drug dispenser 6, the stock data 214 in the stock memory 203 and the feeder data 213 in the host computer 201 are rewritten or renewed. Thus, the host computer 201 can check and control the stock in each feeder 85 of the drug dispenser 6. For example, the host computer may be programmed so as to indicate on the CRT the necessity of replenishing any feeder 85 with drugs if the number of drugs in this feeder falls below a predetermined threshold.

If it is necessary to replenish any feeder 85 with drugs, it is pulled out of the feeder row 74. Its weight is measured before and after replenishing drugs. The measured weights and the name of drugs are inputted in the host computer 201. The host computer 201 calculates the difference between the weights of the feeder before and after replenishing the feeder, i.e. the weight of the drugs replenished. Also, it searches the drug data 211 shown in FIG. 29 to get the unit weight of these drugs. Then, the computer 201 divides the total weight of the drugs replenished by their unit weight to obtain the number of drugs replenished. The thus obtained number of drugs replenished is added to the number of drugs of the corresponding name in the feeder data 213 shown in FIG. 31. It is thus possible to calculate the number of drugs replenished simply by weighing the feeder before and after replenishing drugs, instead of actually counting their number.

In this embodiment, one drug filling machine controlled by one host computer 201. But a plurality of drug filling machines may be controlled by one host computer 201. For example, one host computer 201 may be used to control a drug filling machine for inpatients and a drug filling machine for outpatients. In this case, if "2" is written in the category entry column 217 in the prescription data shown in FIG. 36, the host computer activates the drug filling machine for inpatients to prepare necessary drugs for inpatients. If the number is "1", the host computer activates the drug filling machine for outpatients to prepare drugs for outpatients.

A drug history data list prepared for a plurality of patients and showing the names and kinds of drugs administered before and the patients' case histories may be inputted in the host computer to prevent such accidents as administering the same kind of drugs to a single patient in a large dose or administering a plurality of kinds of drugs which are dangerous if used in combination to a single patient.

Also, drug filling machines installed in a plurality of hospitals and pharmacies may be controlled by a single host computer. In this case, too, it is preferable to use a drug history data list as mentioned above to prevent accidents as mentioned above.

What is claimed is:
1. A drug filling machine comprising:
   a plurality of feeders containing a plurality of different kinds of drugs;
   a means for discharging a plurality of drugs from one or more or said feeders into a vial;
   a vial storage means for separately storing a plurality of different kinds of vials;
   a designating means for designating a kind of vial to be filled with drugs;
   a vial dispensing means for discharging a vial of the kind designated by said designating means from said vial storage means;
   a detecting means for detecting the mouth of the vial discharged by said vial dispensing means;
   a vial erecting means for adjusting the position of said discharged vial based on an output from said detecting means so that said vial is erected with its mouth facing upward;
   a judging means for determining the kind of vial discharged by said vial dispensing means;
   an eliminating means for eliminating the vial discharged by said vial dispensing means if the kind of vial determined by said judging means differs from the kind of vial designated by said designating means;
   a drug filling means comprising a hopper for collecting drugs discharged from said feeders;
   a drug guide means for guiding drugs collected in said hopper into a vial;
   a label printing/sticking means for printing drug data on a label and sticking said label on the vial, wherein the drug data corresponds to the drugs in the vial;
   a transparent sheet printing/sealing means for printing the drug data on a transparent sheet and sealing the mouth of the vial with the transparent sheet; and
   an intermittent conveyor means for receiving a vial discharged by said vial dispensing means and erected by said vial erecting means, and for intermittently sending the vial through said judging means, said eliminating means, said drug filling means and said label printing/sticking means to said transparent sheet printing/sealing means.

2. A drug filling machine as claimed in claim 1, further comprising:

a sealing means for sealing a plurality of vials filled with drugs in an envelope; and a printing means for printing, on said envelope, data corresponding to the drugs contained in the vials sealed in the envelope.

\* \* \* \* \*